(12) United States Patent
Choi et al.

(10) Patent No.: US 10,901,172 B2
(45) Date of Patent: Jan. 26, 2021

(54) CAMERA LENS ASSEMBLY

(71) Applicant: MICRO ACTUATOR CO., LTD., Seongnam-si (KR)

(72) Inventors: Myung-won Choi, Yongin-si (KR); Dae-soon Lim, Yongin-si (KR); Hak-ku Yoon, Suwon-si (KR); Dong-sung Lee, Pyeongtaek-si (KR)

(73) Assignee: MICRO ACTUATOR CO., LTD., Seongnam-si (KR)

( * ) Notice: Subject to any disclaimer, the term of this patent is extended or adjusted under 35 U.S.C. 154(b) by 213 days.

(21) Appl. No.: 16/075,414

(22) PCT Filed: Feb. 6, 2017

(86) PCT No.: PCT/KR2017/001294
§ 371 (c)(1),
(2) Date: Aug. 3, 2018

(87) PCT Pub. No.: WO2017/135789
PCT Pub. Date: Aug. 10, 2017

(65) Prior Publication Data
US 2019/0049692 A1 Feb. 14, 2019

(30) Foreign Application Priority Data

Feb. 4, 2016 (KR) .................. 10-2016-0014259
Jun. 10, 2016 (KR) .................. 10-2016-0072513

(51) Int. Cl.
*G02B 7/02* (2006.01)
*G02B 7/09* (2006.01)
(Continued)

(52) U.S. Cl.
CPC .................. *G02B 7/09* (2013.01); *G02B 7/08* (2013.01); *G03B 3/10* (2013.01); *G03B 9/06* (2013.01);
(Continued)

(58) Field of Classification Search
CPC ... G02B 7/08; G02B 7/04; G02B 7/09; G02B 7/102; G02B 7/023; G02B 7/10;
(Continued)

(56) References Cited

U.S. PATENT DOCUMENTS 4,293,057 A * 10/1981 Globus ................. G03B 37/02
  185/37
5,768,038 A   6/1998 Emura
(Continued)

FOREIGN PATENT DOCUMENTS

CN   105446053 A   3/2016
JP   H10-90584 A   4/1998
(Continued)

OTHER PUBLICATIONS

International Search Report issued in corresponding International Application No. PCT/KR2017/001294 dated Jun. 7, 2017 (2 pages).
(Continued)

*Primary Examiner* — William R Alexander
*Assistant Examiner* — Tamara Y. Washington
(74) *Attorney, Agent, or Firm* — Osha Bergman Watanabe & Burton LLP

(57) ABSTRACT

Disclosed is a camera lens assembly having a lens part and a lens carrier for moving the lens part such that the same moves forward and backward in the direction of an optical axis. The disclosed camera lens assembly comprises: a base part; a lens carrier disposed to be slidable along a direction of an optical axis in the base part; and an automatic focal point adjustment driving part having one portion installed to the base part and the remaining portion installed to the lens carrier, to drive the lens carrier to move forward and backward along the direction of the optical axis by means of an electromagnetic force, wherein a part of the lens carrier and a part of the base part are convex-concave-coupled to
(Continued)

each other, and a plurality of bearings are arranged on the convex-concave-coupled portion.

16 Claims, 21 Drawing Sheets

(51) Int. Cl.
    *H04N 5/232*     (2006.01)
    *H04N 5/225*     (2006.01)
    *G02B 7/08*     (2006.01)
    *G03B 3/10*     (2006.01)
    *G03B 9/06*     (2006.01)

(52) U.S. Cl.
    CPC ....... *H04N 5/2254* (2013.01); *H04N 5/23212* (2013.01); *G03B 2205/0069* (2013.01); *G03B 2217/002* (2013.01)

(58) Field of Classification Search
    CPC .... G02B 13/001; G02B 13/10; G02B 13/009; G02B 13/34; G02B 13/36; H04N 5/225; H04N 5/2257; H04N 5/23212; H04N 5/2253; H04N 5/23296; H04N 5/2252; H04N 5/2328; G03B 2205/0069; G03B 2205/0046; G03B 5/00; G03B 17/02; H02K 41/0356; H02K 41/031; H02K 41/03; H02K 33/18
    USPC ......................................................... 359/824
    See application file for complete search history.

(56) References Cited

U.S. PATENT DOCUMENTS

| | | | | |
|---|---|---|---|---|
| 7,619,838 | B2 * | 11/2009 | Takahashi | G02B 27/646 359/811 |
| 7,692,886 | B1 * | 4/2010 | Lai | G03B 17/56 359/822 |
| 7,755,844 | B2 | 7/2010 | Take | |
| 9,804,408 | B2 | 10/2017 | Rho et al. | |
| 2009/0086334 | A1 | 4/2009 | Take | |
| 2016/0085086 | A1 | 3/2016 | Rho et al. | |

FOREIGN PATENT DOCUMENTS

| | | |
|---|---|---|
| KR | 2009-0033796 A | 4/2009 |
| KR | 2011-0024463 A | 3/2011 |
| KR | 2011-0090090 A | 8/2011 |
| KR | 101451652 B1 | 10/2014 |
| KR | 2014-0146919 A | 12/2014 |
| KR | 2015-0124036 A | 11/2015 |
| KR | 2018-0043287 A | 4/2018 |

OTHER PUBLICATIONS

Written Opinion of the International Searching Authority issued in corresponding International Application No. PCT/KR2017/001294 dated Jun. 7, 2017, with translation (18 pages).
Office Action issued in corresponding Korean Patent Application No. 10-2016-0072513 dated Nov. 13, 2017, with translation (15 pages).
Office Action issued in corresponding Korean Patent Application No. 10-2016-0105412 dated Dec. 12, 2017, with translation (11 pages).
Office Action issued in corresponding Korean Patent Application No. 10-2016-0105412 dated Jun. 25, 2018, with translation (7 pages).
Office Action issued in corresponding Korean Patent Application No. 10-2016-0105513 dated Dec. 12, 2017, with translation (9 pages).
Office Action issued in corresponding Korean Patent Application No. 10-2016-0105513 dated Jul. 1, 2018, with translation (9 pages).
Decision to Grant a Patent issued in corresponding Korean Patent Application No. 10-2016-0072513 dated Jul. 24, 2018, with translation (6 pages).
First Office Action issued in corresponding Chinese Application No. 201780009556.9 dated Jul. 3, 2020 (16 pages).

* cited by examiner

CAMERA LENS ASSEMBLY

TECHNICAL FIELD

Apparatuses consistent with the present disclosure relate to a camera lens assembly, and more particularly, to a subminiature camera lens assembly capable of being auto-focused.

BACKGROUND ART

Recently, a camera lens assembly provided in a small-sized mobile device such as a mobile communication terminal may represent 13 million pixels as in a general digital camera to implement a high level of resolution. As described above, in accordance with improvement of performance of the camera lens assembly mounted in the mobile communication terminal, various functions such as an auto-focusing function, an optical image stabilization function, or the like, as well as an optical zoom function have been used.

An image may be clear depending on a distance between a camera and a subject through the auto-focusing function of these functions.

However, in the camera lens assembly having the auto-focusing function, when a lens carrier moves forward or backward in an optical axis direction for auto-focusing, a problem that the lens carrier does not accurately move (for example, the lens carrier is out of a moving path) due to a manufacturing tolerance between the respective components of the camera lens assembly may occur.

DISCLOSURE

Technical Problem

The present disclosure provides a camera lens assembly in which a lens carrier stably moves forward and backward by disposing a plurality of needle bearings between a base and a lens carrier together with a structure in which portions of the base and portions of the lens carrier are coupled to each other in a ruggedness form.

Technical Solution

According to an aspect of the present disclosure, a camera lens assembly having a lens part and a lens carrier moving the lens part forward and rearward in an optical axis direction includes: a base part; a lens carrier configured to be slidably disposed in the base part in the optical axis direction; and an auto-focusing driving part configured to have a portion installed in the base part and the other portion installed in the lens carrier to drive the lens carrier forward and backward in the optical axis direction through electromagnetic force, wherein a portion of the lens carrier and a portion of the base part are coupled to each other in a ruggedness form, and a plurality of bearings are disposed at the portions coupled to each other in the ruggedness form.

The plurality of bearings may be needle bearings.

The base part may include: a body having a space part in which the lens carrier is installed; and a side part detachably coupled to one side of the body.

The body of the base part may be coupled to the side part of the base part in a snap manner.

A pair of installation surfaces disposed to be symmetrical to each other and in contact with the plurality of needle bearings may be formed at one side of the lens carrier, and a pair of inclined surfaces facing the pair of installation surfaces of the lens carrier, respectively, may be formed at both sides of the side part, respectively.

An angle between the pair of installation surfaces formed in the lens carrier may be an obtuse angle.

An angle between the pair of installation surfaces formed in the lens carrier may be a right angle.

A plurality of protrusions may be formed in the base part, and a plurality of grooves into which the plurality of protrusions are slidably inserted may be formed in the lens carrier so that the lens carrier is movable in the optical axis direction.

The camera lens assembly may further include a lens carrier guide part configured to support the plurality of needle bearings, wherein the lens carrier guide part includes a pair of retainers mounted on the pair of installation surfaces of the lens carrier, respectively.

Portions of the plurality of needle bearings may be inserted into a plurality of recessed grooves formed in the pair of installation surfaces of the lens carrier, and the other portions of the plurality of needle bearings may be in slidable contact with the pair of inclined surfaces of the side part through through-holes formed in the respective retainers.

The auto-focusing driving part may include: a first magnet disposed on one side surface of the lens carrier; a first coil disposed at an inner side of the base part to face the first magnet; and a first yoke disposed behind the first coil.

The camera lens assembly may further include: a plurality of blades configured to have portions disposed in the lens carrier while overlapping each other; and a light amount adjustment driving part configured to be installed at one edge of the lens carrier and drive the plurality of blades to adjust an opening degree of a light passing hole by simultaneously rotating the plurality of blades.

The light amount adjustment driving part may include: a driving arm installed in the lens carrier and having the plurality of blades hinge-connected to both ends thereof; a second magnet installed to be fixed to the driving arm and rotating together with the driving arm; and a second coil installed in the lens carrier and rotating the second magnet.

The second magnet may be a circular magnet, the light amount adjustment driving part may further include a yoke of which one end is disposed adjacent to the circular magnet, and the circular magnet may rotate in a clockwise direction or a counterclockwise direction depending on a direction of a current flowing to the second coil.

The plurality of bearings may be ball bearings.

The lens carrier may include: a guide protrusion having a pair of inclined surfaces in contact with some of the plurality of bearings and formed to protrude; and a guide surface in contact with the others of the plurality of bearings.

First and second guide grooves in which the plurality of bearings are slidably seated may be formed in the lens carrier, and the first guide groove may correspond to the guide protrusion and the second guide groove may correspond to the guide surface.

The guide protrusion may be coupled to the first guide groove in a ruggedness form.

An extended part partitioning a space of the first guide groove into upper and lower spaces may be formed in the first guide groove.

A pair of installation surfaces into which the guide protrusion is insertable may be formed at the center of the extended part, and the pair of installation surfaces may be formed to face the inclined surfaces of the guide protrusion.

The camera lens assembly may further include a plurality of blades configured to have portions disposed in the lens carrier while overlapping each other.

The camera lens assembly may further include a light amount adjustment driving part configured to be installed at one edge of the lens carrier and drive the plurality of blades to adjust an opening degree of a light passing hole by simultaneously rotating the plurality of blades.

The auto-focusing driving part and the light amount adjustment driving part may be disposed to face each other.

The plurality of ball bearings inserted into the first guide groove may be in point contact with three points.

The lens part may include a plurality of lenses, and an aperture stop may be disposed between any two of the plurality of lenses.

A distance between the two lenses between which the aperture stop is disposed may be set to be larger than those between the other lenses adjacent to each other.

Advantageous Effects

As set forth above, according to the present disclosure, portions of the lens carrier and portions of the base may be coupled to each other in the ruggedness form, resulting in prevention of the lens carrier from being shaken in directions (X-axis and Y-axis directions) perpendicular to an optical axis (a Z axis) when the lens carrier moves along the optical axis (the Z axis). In addition, according to the present disclosure, the plurality of needle bearings may be disposed between the base and the lens carrier and support the lens carrier, such that the lens carrier may move forward and backward along the optical axis (the Z axis) in a state in which it is structurally stabilized.

BEST MODE

Hereinafter, exemplary embodiments of the present disclosure will be described in detail with reference to the accompanying drawings. Exemplary embodiments described below are illustratively provided to assist in understanding of the present disclosure, and it is to be understood that the present disclosure may be variously modified and executed unlike exemplary embodiments described herein. However, when it is decided that a detailed description for the known functions or components related to the present disclosure may obscure the gist of the present disclosure, the detailed description and concrete illustration will be omitted. Further, the accompanying drawings are not illustrated to scale, but sizes of some of components may be exaggerated to assist in the understanding of the present disclosure.

In addition, in the following description, a 'forward direction' of a lens carrier refers to a direction in which the lens carrier moves in a direction in which a distance between one surface of a base and one surface of the lens carrier facing one surface of the base is increased, and a 'backward direction' of the lens carrier refers to a direction in which the lens carrier moves in a direction in which the distance between one surface of the base and one surface of the lens carrier facing one surface of the base is decreased.

Figure 1:
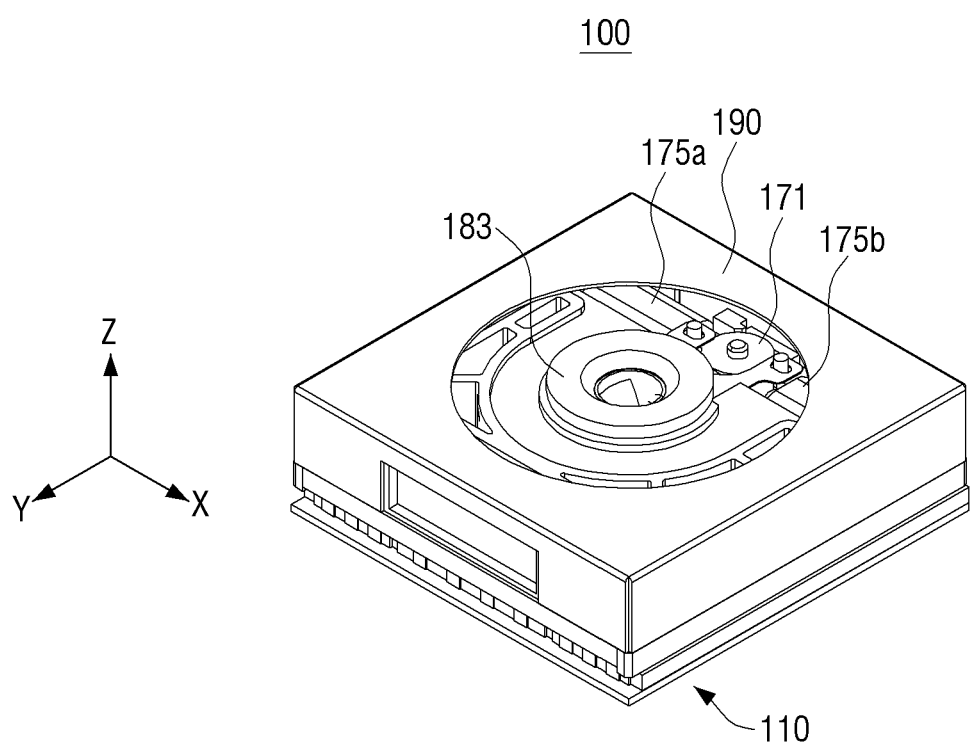
FIG. 1 is an assembled perspective view illustrating a camera lens assembly according to an exemplary embodiment of the present disclosure.

FIGS. 1 and. 2 are, respectively, an assembled perspective view and an exploded perspective view illustrating the camera lens assembly according to an exemplary embodiment of the present disclosure.

Figure 2:
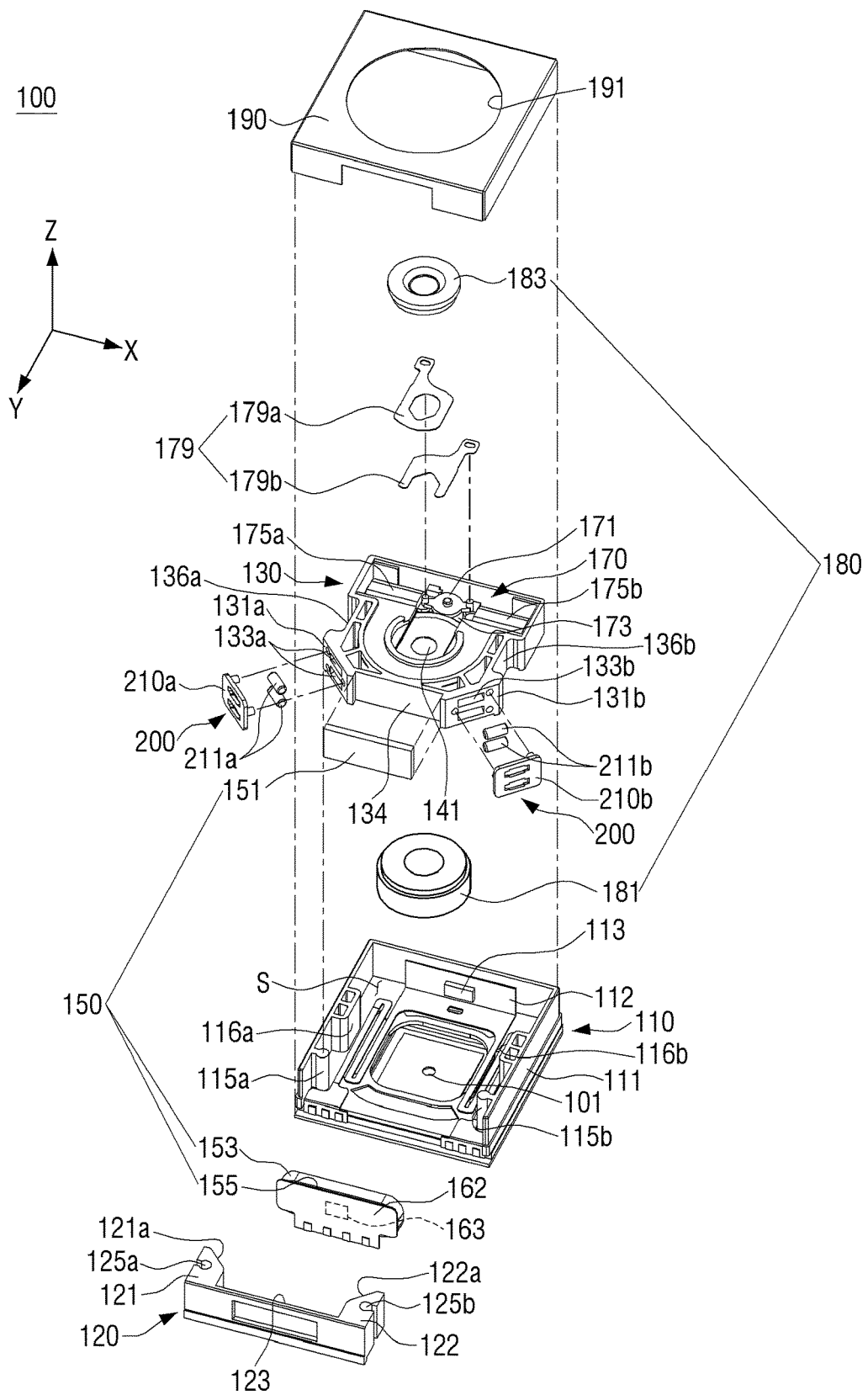
FIG. 2 is an exploded perspective view illustrating the camera lens assembly according to an exemplary embodiment of the present disclosure.

Referring to FIGS. 1 and 2, the camera lens assembly 100 according to an exemplary embodiment of the present disclosure may include a base part 110, a lens carrier 130 disposed in the base part 110 to be movable forward and backward, an auto-focusing driving part 150, a light amount adjustment driving part 170, a lens part 180, a shield can 190 covering one side surface of the base part 110, and a lens carrier guide part 200 supporting the lens carrier 130 to be movable forward and backward in an optical axis (a Z axis).

The base part 110 may include a body 111 and a side part 120 detachably coupled to one side of the body 111.

The body 111 may have a space part S in which the lens carrier 130 is installed, and may include a third light passing hole 101 through which light may pass. A pair of protrusions 116a and 116b are formed to protrude on a circumference of the body 111 in the space part S of the body 111. As illustrated in FIG. 2, the protrusions 116a and 116b may be formed to be symmetric to each other with respect to the optical axis, but are not limited thereto. For example, a plurality of protrusions may also be formed to protrude at predetermined intervals on the circumference of the body 111. The protrusions 116 may prevent rotation and separation of the lens carrier 130 together with grooves 136 of the lens carrier 130 to be described below. The protrusions 116a and 116b may guide the lens carrier 130 to be movable forward and backward in an optical axis direction (a Z-axis direction), but are not in direct contact with the lens carrier 130. A flexible printed circuit board (FPCB) 112 for the light amount adjustment driving part 170 is adhered to the lens carrier 130, and is then adhered to the body 111 when the lens carrier 130 to which the FPCB 112 is adhered is installed in the body 111. A light amount adjustment hall sensor 113 is mounted on the FPCB 112. In addition, a pair of coupling protrusions 115a and 115b coupled to a pair of coupling grooves 125a and 125b of the side part 120 in a snap manner, respectively, are formed in the body 111. A portion of the FPCB 112 is adhered to the lens carrier 130, and the other portion thereof is adhered to the body 111. This is to transmit a driving signal for driving an aperture stop 179 moving together with the lens carrier 130. In this case, since the lens carrier 130 moves forward and backward along an axis (the Z axis), a region between portions of the FPCB 112 adhered to the respective components, that is, a central portion of the FPCB 112 is not adhered anywhere, and is curved to have a margin length. This is to prevent self elastic force of the FPCB 112 from affecting forward movement and backward movement of the lens carrier 130.

The side part 120 is coupled to the body 111 to form one side surface of the base part 110. A first yoke accommodating groove 123 in which a portion of an auto-focusing driving part 150 to be described below is formed between both sides 121 and 122 of the side part 120. The pair of coupling grooves 125a and 125b are formed in both sides 121 and 122 of the side part 120, respectively, and a pair of inclined surfaces 121a and 122a in contact with needle bearings 211a and 211b of the lens carrier guide part 200 to be described below are formed at both sides 121 and 122 of the side part 120. The side part 120 are concavely formed by the pair of inclined surfaces 121a and 122a, and the lens carrier 130 are convexly formed by a pair of installation surfaces 131a and 131b to correspond to the side part 120, such that the side part 120 and the lens carrier 130 have a structure in which they are engaged with each other. Portions of the lens carrier 130 and portions of the base part 110 are coupled to each other in a ruggedness form.

The lens carrier 130 is installed in the space part S of the base part 110 to be movable forward and backward in the optical axis direction (the Z-axis direction), and is formed of a frame forming an approximately closed loop to surround the lens part 180. A second light passing hole 141 through which light may be incident may be formed in the center of the lens carrier 130. The light amount adjustment driving part 170 may be mounted on one side surface of an inner side of the lens carrier 130, and a first lens module 181 and a second lens module 183 may be formed along the optical axis, which is the center of the lens carrier 130.

The lens carrier 130 moves the first lens module 181 and the second lens module 183 of the lens part 180 forward and backward in the optical axis direction by the auto-focusing driving part 150. A plurality of grooves 136a and 136b through which the protrusions 116a and 116b of the base part 110 slidably penetrate, respectively, are extended in an outer circumference of the lens carrier 130. In this case, it is preferable that the grooves 136a and 136b are formed at positions corresponding to those of the protrusions 116a and 116b of the base part 110 and have shapes corresponding to those of the protrusions 116a and 116b of the base part 110. This is to approximately guide a coupling position between the lens carrier 130 and the base part 110.

The pair of installation surfaces 131a and 131b on which the lens carrier guide part 200 is installed are disposed at the other side of the lens carrier 130 to be symmetrical to each other with respect to the optical axis. A plurality of recessed grooves 133a and 133b are formed in the pair of installation surfaces 131a and 131b, respectively. In this case, the plurality of recessed grooves 133a and 133b may be formed in the same direction and at the same angle, and a plurality of needle bearings 211a and 211b are slidably inserted partially into the plurality of recessed grooves 133a and 133b, respectively.

Since the pair of installation surfaces 131a and 131b of the lens carrier 130 are formed to be inclined, portions of the lens carrier 130, that is, portions of the lens carrier 130 on which the pair of installation surfaces 131a and 131b are formed may be inserted into the side part 120. A structure in which the portions of the lens carrier 130 are inserted into the side part 120 is an approximately ruggedness structure. In this case, the pair of inclined surfaces 121a and 122b inclined to face the pair of installation surfaces 131a and 131b, respectively, are formed at both sides 121 and 122 of the side part 120, respectively.

A coupling groove 134 in which a first magnet 151 to be described below is installed is formed between the pair of installation surfaces 131a and 131b of the lens carrier 130.

The auto-focusing driving part 150 is disposed between the lens carrier 130 and the side part 120 of the base part 110, and moves the lens carrier 130 in a forward direction and a backward direction by a predetermined distance through electromagnetic force. The auto-focusing driving part 150 includes the first magnet 151, a first coil 153, and a first yoke 155.

The first magnet 151 is disposed on one side surface of the lens carrier 130, and is configured to correspond to an outer circumference of the lens carrier 130 between the pair of installation surfaces 131a and 131b. In this case, the first magnet 151 has a predetermined length, and has N poles and S poles magnetized on inner and outer peripheral surfaces of one side and the other side thereof, respectively. That is, the N pole and the S pole may be magnetized, respectively, at one side and the other side of a surface of the first magnet 151 facing the coil, and the S pole and the N pole may be magnetized, respectively, at one side and the other side of an opposite surface to the surface described above. As described above, the N poles and the S poles are magnetized as four poles on the inner and outer peripheral surfaces of both sides of the first magnet 151, respectively, to form a magnetic section in which strength of magnetic force sensed by an auto-focusing hall sensor 163 is approximately uniformly increased or decreased.

The first coil 153 is disposed at an inner side of the side part 120 to face the first magnet 151, and is fixedly installed simultaneously with being electrically connected to an FPCB 162 for the auto-focusing driving part 150.

The first yoke 155 is disposed behind the first coil 153, and is fixed to the first yoke 155 accommodating groove 123 of the side part 120. The first yoke 155 is formed to have a width slightly larger than that of the first coil 153, and may thus increase strength of a magnetic field formed between the first coil 153 and the first magnet 151 and expand the magnetic field.

Meanwhile, the auto-focusing hall sensor 163 is mounted on the FPCB 162. The auto-focusing hall sensor 163 is disposed to be adjacent to and be spaced apart from an outer peripheral surface of the first magnet 151, and is electrically connected to the FPCB 162.

The light amount adjustment driving part 170 is disposed in the lens carrier 130, and includes a second magnet 173 having a circular shape, second coils 175a and 175b disposed at both sides of the second magnet 173, respectively, and a driving arm 171 coupled to one surface of the second magnet 173 while forming a concentric axis with the second magnet 173. In this case, the second coils 175a and 175b are wound around yokes (not illustrated), respectively.

The aperture stop 179 includes a first blade 179a and a second blade 179b, and portions of the first and second blades 179a and 179b are hinge-connected to the driving arm 171. Therefore, the first and second blades 179a and 179b adjust a region through which light passes to be increased or decreased while being linearly driven in a direction (a Y-axis direction) perpendicular to the optical axis when the driving arm 171 rotates in a clockwise direction and a counterclockwise direction. The aperture stop 179 may be slidably supported by a cover (not illustrated) coupled to the lens carrier 130.

The lens part 180 may include the first lens module 181 and the second lens module 183 installed in the lens carrier 130 and moving forward and backward in the optical axis direction (the Z-axis direction) together with the lens carrier 130.

A first light passing hole 191 through which the light may be incident to the lens part 180 may be formed in one surface of the shield can 190.

The lens carrier guide part 200 may include a pair of retainers 210a and 210b mounted on the pair of installation surfaces 131a and 131b of the lens carrier 130, respectively, and the plurality of needle bearings 211a and 211b rotatably installed on the pair of installation surfaces 131a and 131b of the lens carrier 130 by the respective retainers 210a and 210b. Portions of the plurality of needle bearings 211a and 211b are inserted into the plurality of recessed grooves 133a and 133b formed in the respective installation surfaces 131a and 131b, and the other portions of the plurality of needle bearings 211a and 211b are in slidable contact with the respective inclined surfaces 121a and 122a of the side part 120 through through-holes of the respective retainers 210a and 210b. The plurality of needle bearings 211a and 211b of the lens carrier guide part 200 is in slidable contact with the side part 120 at positions symmetric to each other with respect to the center of the inner side of the lens carrier 130 to act so that they are uniformly supported by the entirety of the respective inclined surfaces 121a and 122a of the side part 120 when the lens carrier 130 is vertically driven with respect to the base part 110.

Figure 3:
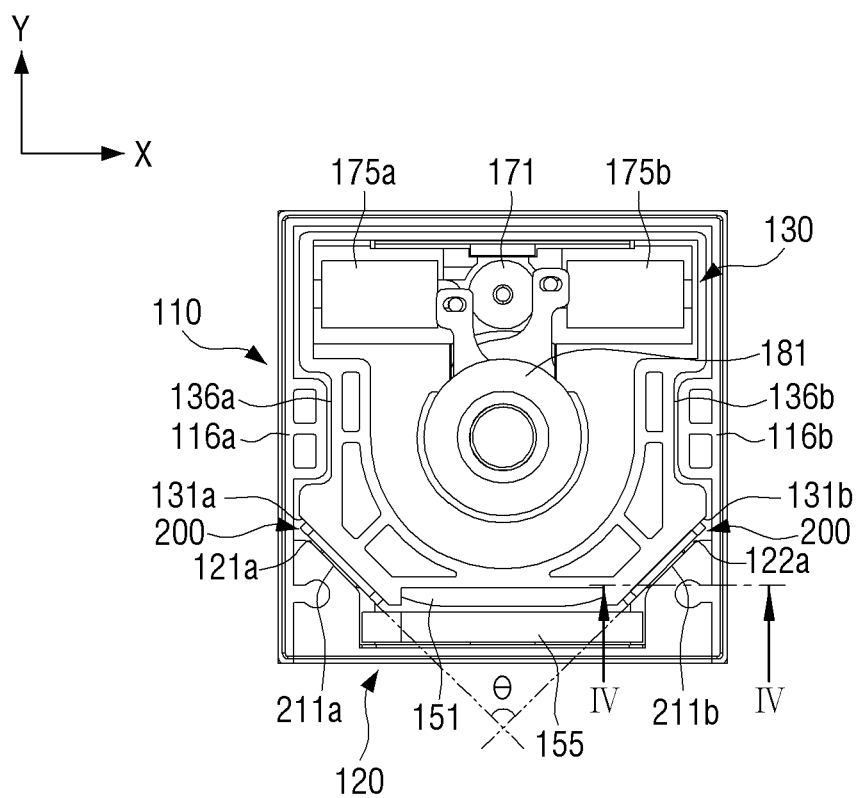
FIG. 3 is a plan view illustrating the camera lens assembly in a state in which a shield can illustrated in FIG. 1 is omitted.
Figure 4:
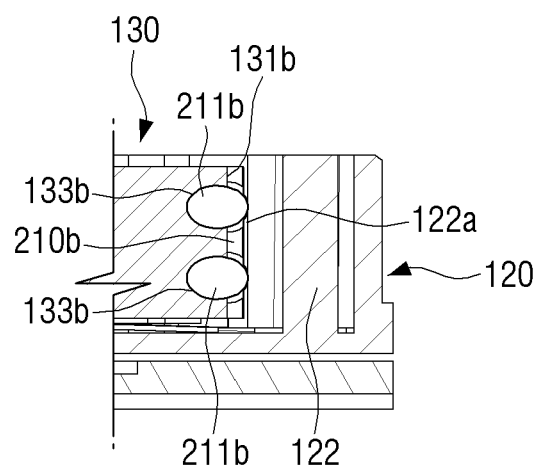
FIG. 4 is a cross-sectional view taken along line IV-IV of FIG. 3.

FIG. 3 is a plan view illustrating the camera lens assembly in a state in which a shield can illustrated in FIG. 1 is omitted, and FIG. 4 is a cross-sectional view taken along line IV-IV of FIG. 3.

Referring to FIG. 3, portions of the lens carrier 130 and the side part 120, which is a portion of the base part 110, are coupled to each other in a ruggedness form, and the plurality of needle bearings 211a and 211b are disposed at the portions coupled to each other in the ruggedness form. The pair of installation surfaces 131a and 131b of the lens carrier 130 are formed to be inclined, and are disposed to be symmetrical to each other with respect to the optical axis. Meanwhile, the pair of inclined surfaces 121a and 122a inclined to face the pair of installation surface 131a and 131b of the lens carrier 130 are disposed at both sides of the side part 120 of the base part 110 coupled to the carrier 130 in the ruggedness form.

The lens carrier guide part 200 is disposed at the coupled portion having the ruggedness form, and guides the lens carrier 130 so that the lens carrier 130 is driven forward and backward in the optical axis direction. The lens carrier guide parts 200 are disposed to be symmetrical to each other with respect to the optical axis so that an angle (θ) formed by the pair of inclined surfaces 121a and 122a of the side part 20 is an obtuse angle of 90° or more on the same plane. Preferably, the angle (θ) formed by the pair of inclined surfaces 121a and 122a of the side part 120 is a right angle. A case in which the angle (θ) formed by the pair of inclined surfaces 121a and 122a of the side part 20 is the obtuse angle is described. However, the angle (θ) formed by the pair of inclined surfaces 121a and 122a of the side part 20 is not limited thereto, but may be an acute angle.

Likewise, an angle (θ) formed by the pair of installation surfaces 131a and 131b of the lens carrier 130 is also an obtuse angle of 90° or more.

Due to a structure in which the pair of inclined surfaces 121a and 122a of the side part 120 and the pair of installation surfaces 131a and 131b of the lens carrier 130 are formed to be inclined as described above, the lens carrier 130 may be driven along a predetermined path without being shaken in directions (X-axis and Y-axis directions) perpendicular to the optical axis. Therefore, the lens carrier 130 may stably perform driving in the forward direction and the backward direction in spite of manufacturing tolerances of the respective components.

In addition, when the lens carrier 130 is driven forward or backward, the protrusions 116a and 116b formed in the base part 110 may be slidably inserted into the plurality of grooves 136a and 136b formed in the outer circumference of the lens carrier 130.

Referring to FIG. 4, the plurality of needle bearings 211a and 211b are positioned between the lens carrier 130 and the base part 110, and guide forward movement and backward movement of the lens carrier 130. In detail, one sides of the plurality of needle bearings 211a and 211b are slidably disposed in the plurality of recessed grooves 133a and 133b formed in the respective installation surfaces 131a and 131b of the lens carrier 130, respectively, and the other sides thereof are in slidable contact with the respective inclined surfaces 121a and 122a formed in the side part 120, respectively. In this case, one sides of the plurality of needle bearings 211a and 211b may be in surface contact or line contact with the plurality of recessed grooves 133a and 133b, and the other sides thereof may be maintained in a state in which they are in line contact with the respective inclined surfaces 121a and 122a.

Therefore, the lens carrier 130 may be smoothly driven in the forward direction and the backward direction inside the space part S of the base part 110 by the plurality of needle bearings 211a and 211b.

Hereinafter, forward movement and backward movement operations of the lens carrier by the auto-focusing part of the camera lens assembly according to an exemplary embodiment of the present disclosure configured as described above are described with reference to FIGS. 5 to 6B.

Figure 5:
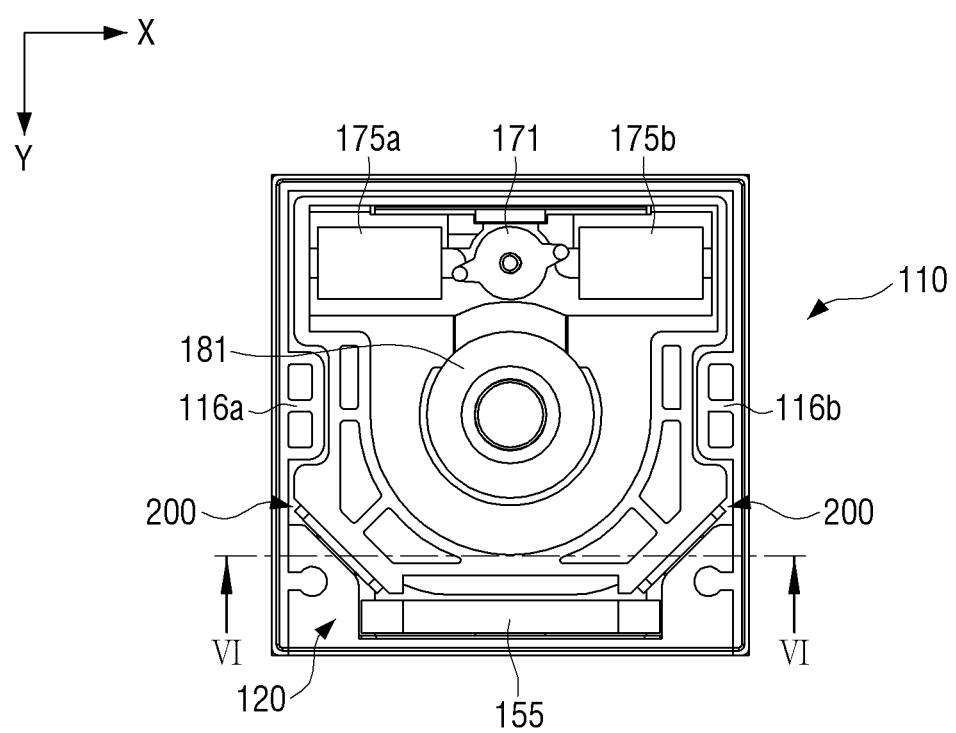
FIG. 5 is a plan view illustrating the camera lens assembly in a state in which a shield can and an aperture stop illustrated in FIG. 1 are omitted.
Figure 6A:
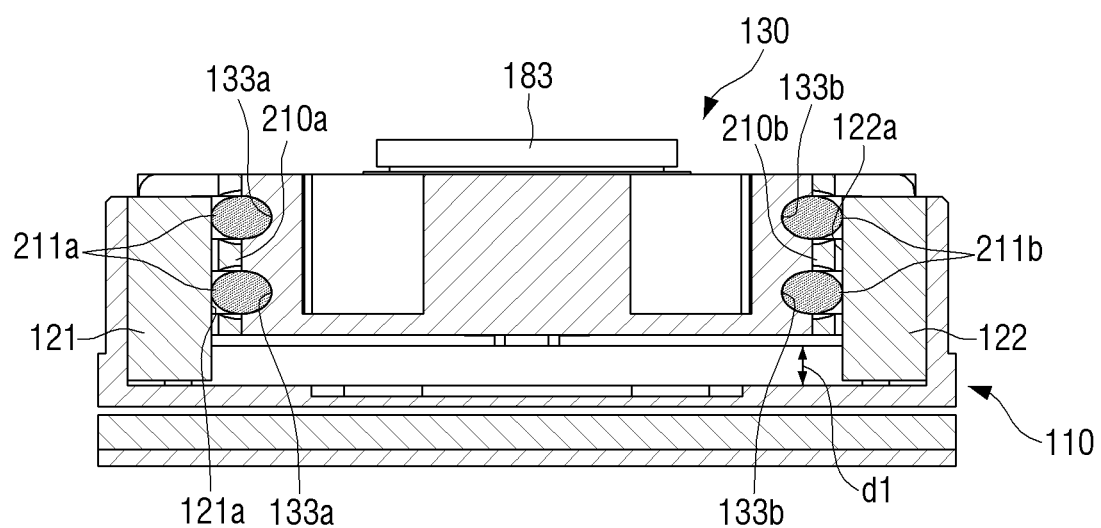
FIGS. 6A and 6B, which are cross-sectional views taken along line VI-VI of FIG. 5, illustrate a forward movement state and a backward movement state of a lens carrier, respectively.
Figure 6B:
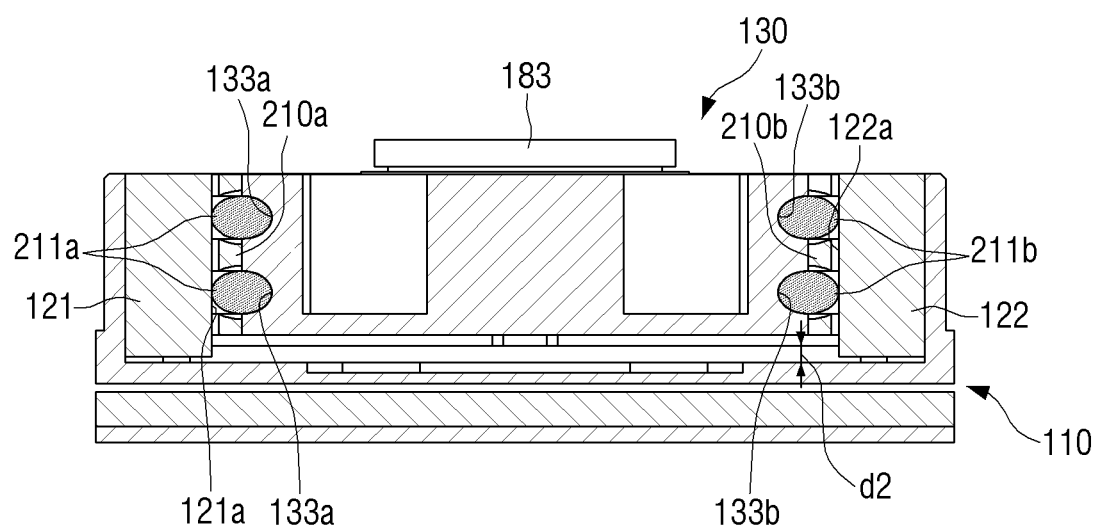

FIG. 5 is a plan view illustrating the camera lens assembly in a state in which a shield can and an aperture stop illustrated in FIG. 1 are omitted, and FIGS. 6A and 6B, which are cross-sectional views taken along line VI-VI of FIG. 5, illustrate a forward movement state and a backward movement state of a lens carrier, respectively.

First, referring to FIG. 6A, in the case of a forward movement operation of the lens carrier, when a current is applied to the first coil 153 of the auto-focusing driving part 150 on one direction, electromagnetic force is generated between the first magnet 151 and the first coil 153, such that the first magnet 151 is pushed in the forward direction. Therefore, the lens carrier 130 is driven forward in the optical axis direction. The lens carrier is driven forward, such that a distance d1 between one surface of the base and one surface of the lens carrier facing one surface of the base is increased. In this case, the plurality of needle bearings 211a and 211b slidably support the lens carrier 130 to guide the lens carrier 130 so that the lens carrier 130 may be stably driven forward. In this case, the auto-focusing hall sensor 163 senses strength of magnetic force of the first magnet 151 changed depending on a change in a position of the first magnet 151, and transmits a sensed signal to a controller (not illustrated) of a portable device (not illustrated) in which the camera lens assembly 100 is installed.

The controller may control a forward movement distance d of the lens carrier 130 through the sensed signal of the auto-focusing hall sensor 163. For example, when the forward movement distance of the lens carrier 130 is set, the current applied to the first coil 153 of the auto-focusing driving part 150 is controlled. In this case, the lens carrier 130 stops in place, and does not move forward or backward.

Meanwhile, referring to FIG. 6B, in the case of a backward movement operation of the lens carrier, a current is applied to the first coil 153 in a reverse direction to a direction in which it is applied to the first coil 153 at the time of the forward movement operation of the lens carrier, such that electromagnetic force is generated in an opposite direction to a direction at the time of forward movement of the lens carrier between the first coil 153 and the first magnet 151. Therefore, the first magnet 151 is pushed in the backward direction as opposed to the forward movement operation of the lens carrier. Therefore, the lens carrier 130 is driven backward. The lens carrier is driven backward, such that a distance d2 between one surface of the base and one surface of the lens carrier facing one surface of the base is decreased. Also in this case, the lens carrier is slidably supported by the plurality of needle bearings 211a and 211b, such that it may be stably driven backward. Also at the time of the backward movement of the lens carrier 130, when the current applied to the first coil 153 is controlled, the lens carrier 130 may stop in place.

When the lens carrier 130 is driven for short and long distance focuses as described above, the lens carrier is slidably guided with respect to the base part 110 by the plurality of needle bearings 211a and 211b. As described above, the plurality of needle bearings 211a and 211b may be supported in a state in which they are in line contact with the pair of inclined surfaces 121a and 122a of the base part 110, resulting in prevention of shaking due to external impact or various vibrations. In addition, due to a line contact structure of the needle bearings 211a and 211b, management points for managing tolerances of a manufacturing process are decreased, such that dimension management is easy.

An operation of the aperture stop of the camera lens assembly according to an exemplary embodiment of the present disclosure configured as described above is described.

Figure 7A:
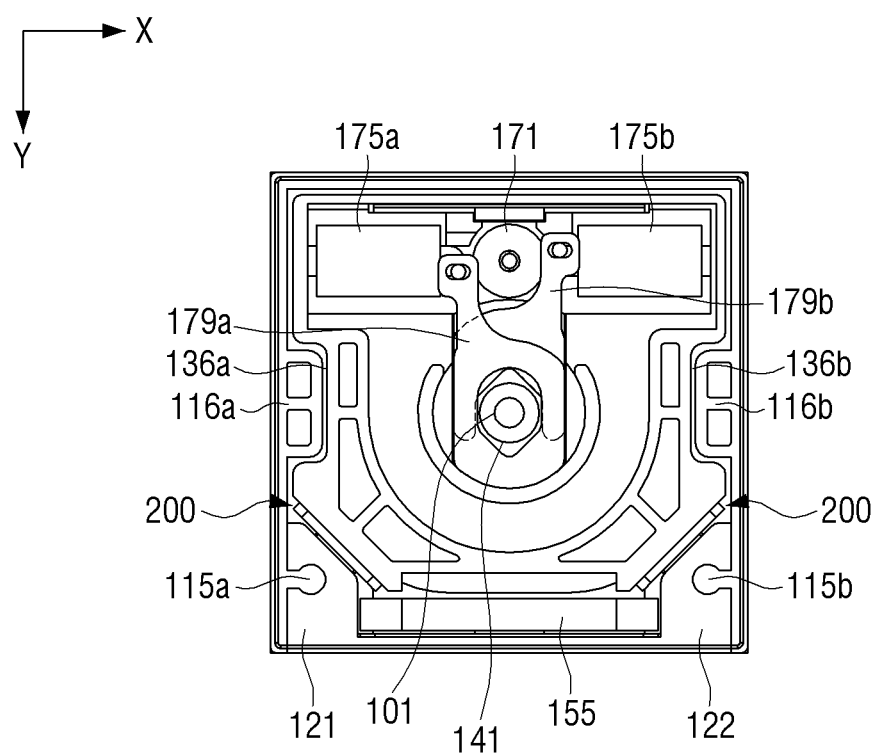
FIGS. 7A and 7B, which are plan views illustrating the camera lens assembly in a state in which a shield can illustrated in FIG. 1 is omitted, illustrate driving states of an aperture stop, respectively.
Figure 7B:
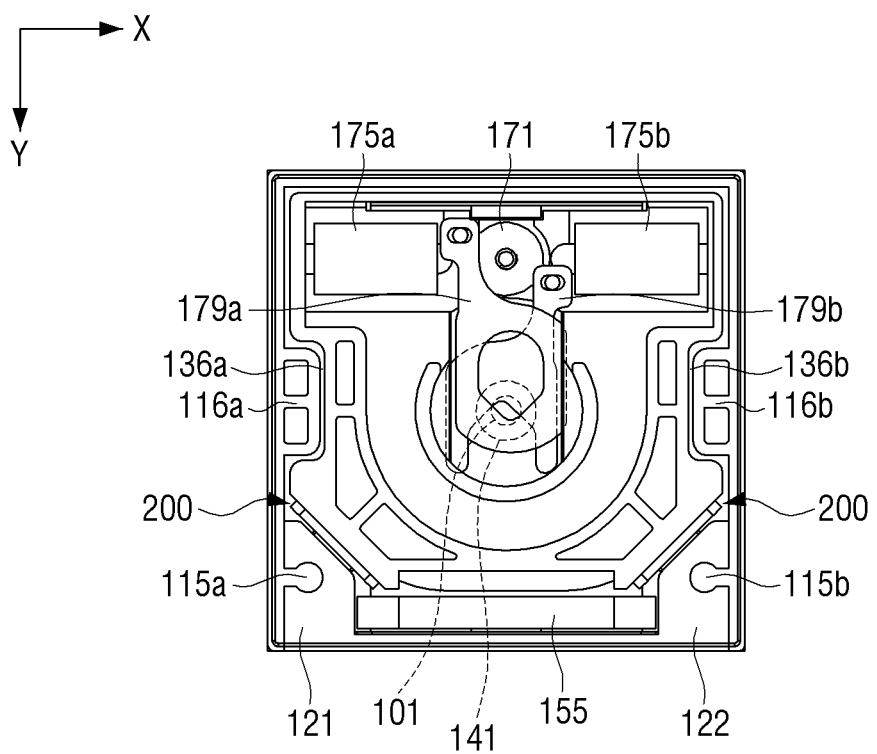

FIGS. 7A and 7B illustrate driving states of an aperture stop, respectively, in a state in which a shield can illustrated in FIG. 1 is omitted.

In a case in which the aperture stop 179 is in a completely opened state as illustrated in FIG. 7A, the controller (not illustrated) applies a current to the second coils 175a and 175b disposed, respectively, at both sides of the second magnet 173 to form attractive force at one ends of both sides of the second coils 175a and 175b facing the second magnet 173. In this case, the second magnet 173 does not rotate, the driving arm 171 coupled to one surface of the second magnet 173 does not also rotate, and the first and second blades 179a and 179b of which portions are coupled to the driving arm 171 move in directions opposite to each other in the direction (the Y-axis direction) perpendicular to the optical axis to completely open the second and third light passing holes 141 and 101.

In the case in which it is intended to decrease a region through which the light passes as illustrated in FIG. 7B in a state in which the second and third light passing holes 141 and 101 are completely opened as described above, the controller may control a current flowing to the second coils 175a and 175b to rotate the second magnet 173 by a predetermined angle (for example, 45 degrees) in the clockwise direction, such that the first and second blades 179a and 179b may adjust the region through which the light passes to be decreased or minimized to block portions of the second and third light passing holes 141 and 101.

In detail, the controller applies a current in an opposite direction to that in an open state to the second coils 175 and 175b. In this case, the second magnet 173 rotates by a predetermined angle (for example, 45 degrees) in the clockwise direction, and the driving arm 173 coupled to one surface of the second magnet 173 while forming the concentric axis with the second magnet 173 also rotates by the same rotation angle as that of the second magnet 173 in the clockwise direction. The first and second blades 179a and 179b of which the portions are coupled to the driving arm 171 move in directions opposite to each other due to the rotation of the driving arm 171 to decrease or minimize opening degrees of the second and third light passing holes 141 and 101, as illustrated in FIG. 7B.

In this case, the first and second blades 179a and 179b configuring the aperture stop 179 may be slidably supported by the cover (not illustrated) coupled to the lens carrier 130.

The camera lens assembly 100 according to an exemplary embodiment of the present disclosure as described above may adjust the aperture stop in a plurality of steps by including the light amount adjustment driving part 170 and the aperture stop 179 interlocking with the light amount adjustment driving part 170. Therefore, the camera lens assembly 100 according to an exemplary embodiment of the present disclosure may adjust a photographing condition in several steps depending on an amount of external light.

Figure 8:
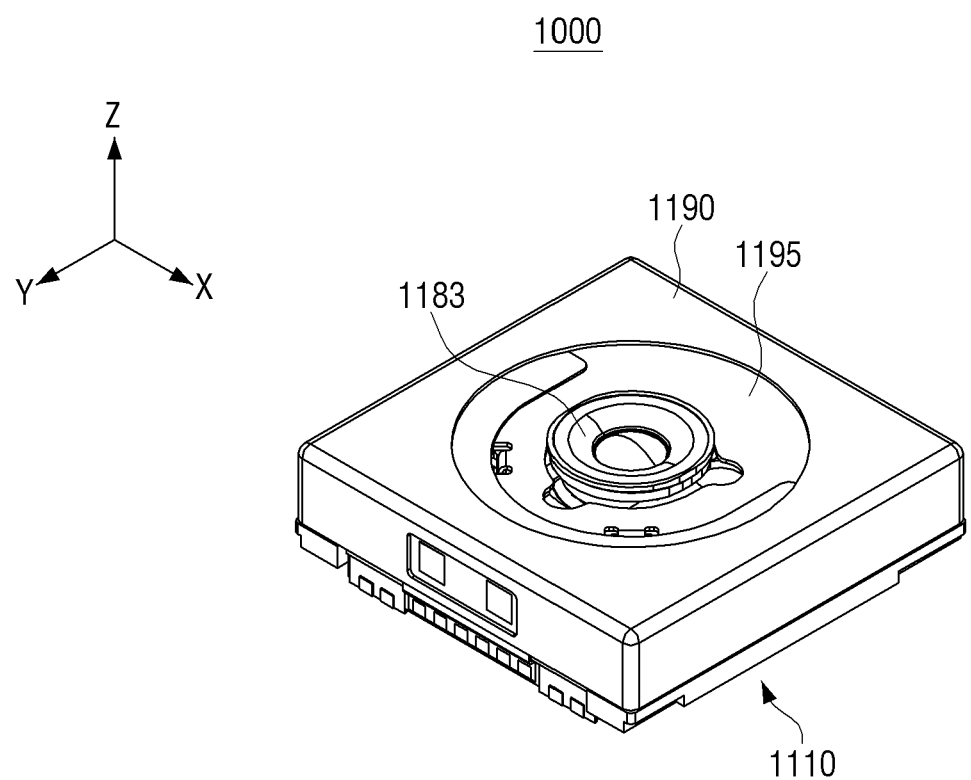
FIG. 8 is an assembled perspective view illustrating a camera lens assembly according to another exemplary embodiment of the present disclosure.

FIGS. 8 and. 9 are, respectively, an assembled perspective view and an exploded perspective view illustrating the camera lens assembly according to another exemplary embodiment of the present disclosure.

Figure 9:
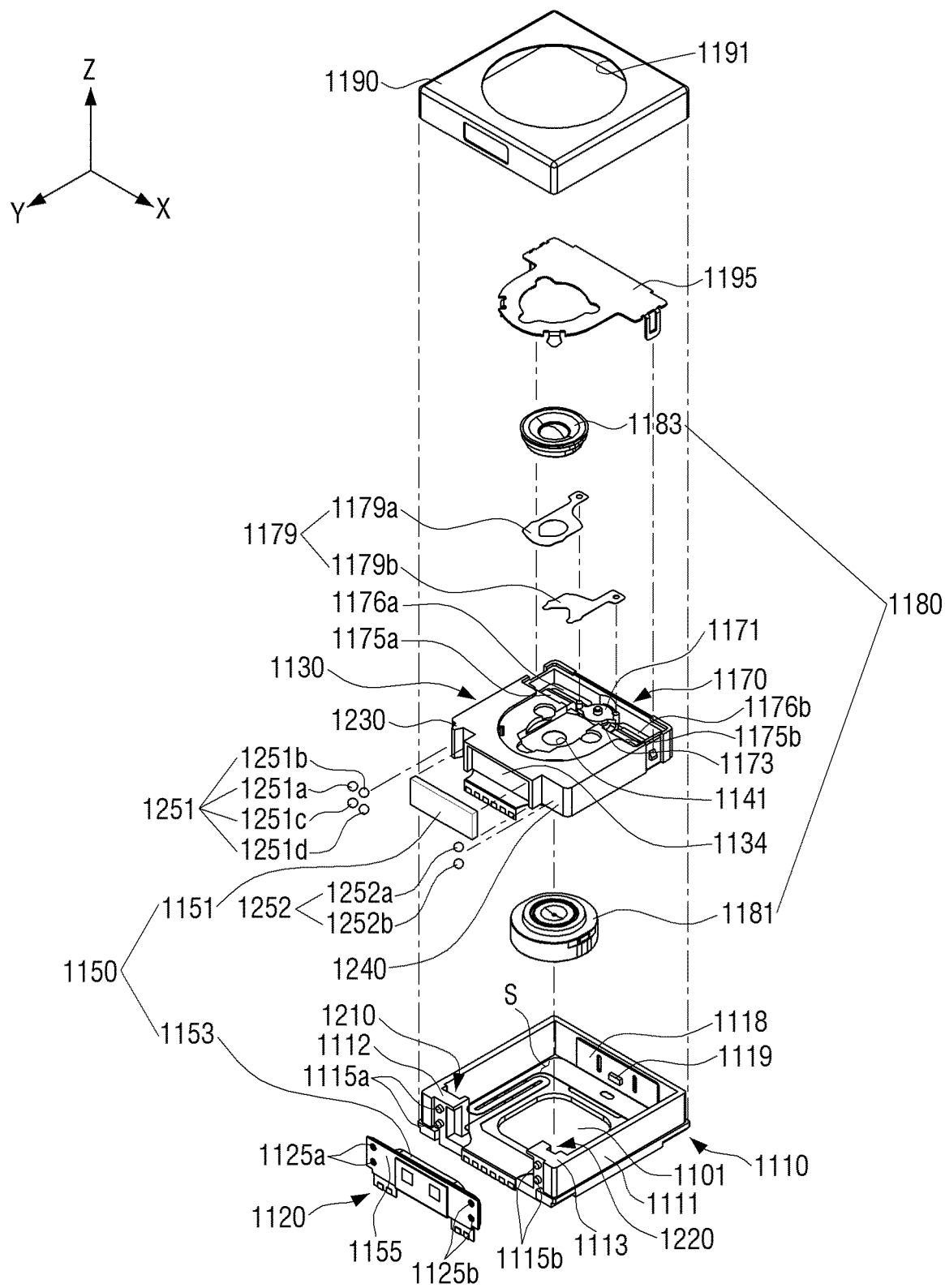
FIG. 9 is an exploded perspective view illustrating the camera lens assembly according to another exemplary embodiment of the present disclosure.

Referring to FIGS. 8 and 9, the camera lens assembly 1000 according to another exemplary embodiment of the present disclosure may include a base part 1110, a lens carrier 1130 disposed in the base part 1110 to be movable forward and backward, an auto-focusing driving part 1150, a light amount adjustment driving part 1170, a lens part 1180, a carrier cover 1195 covering one side surface of the lens carrier 1130, a shield can 190 covering one side surface of the base part 1110, and a lens carrier guide part 1200 (see FIG. 12A) supporting the lens carrier 1130 to be movable forward and backward in an optical axis (a Z axis).

The base part 1110 may include a body 1111 and a side part 1120 detachably coupled to one side of the body 1111.

The body 1111 may have a space part S in which the lens carrier 1130 is installed, and may include a third light passing hole 1101 through which light may pass. An FPCB 1118 for the light amount adjustment driving part 1170 is first adhered to the lens carrier 1130. When the lens carrier 1130 to which the FPCB 1118 is adhered is installed in the body 1111, the FPCB 1118 is disposed in the body 1111, and a light amount adjustment hall sensor 1119 is mounted on the FPCB 1118. In addition, a pair of coupling protrusions 1115a and 1115b coupled to a pair of coupling grooves 1125a and 1125b of the side part 1120 in a snap manner, respectively, are formed in the body 1111. A portion of the FPCB 1118 is adhered to the lens carrier 1130, and the other portion thereof is adhered to the body 1111. This is to transmit a driving signal for driving an aperture stop 1179 moving together with the lens carrier 1130. In this case, since the lens carrier 1130 moves forward and backward along an axis (the Z axis), a region between portions of the FPCB 1118 adhered to the respective components, that is, a central portion of the FPCB 1118 is not adhered anywhere, and is curved to have a margin length. This is to prevent self elastic force of the FPCB 1118 from affecting forward movement and backward movement of the lens carrier 1130.

A pair of guide grooves 1210 and 1220 of the lens carrier guide part 1200 are formed to be in contact with ball bearings 1251 and 1252 to be described above. A first guide groove 1210 and a second guide groove 1220 are formed at both sides 1112 and 1113 of the body 1111.

The first guide groove 1210 includes a first extended part 1215 formed at the center thereof and partitioning a space of the first guide groove 1210 into upper and lower spaces. The space of the first guide groove 1210 may be partitioned into a first upper guide groove 1211 and a first lower guide groove 1213 by the first extended part 1215. The first extended part 1215 has an opening formed therein so that the first upper guide groove 1211 and the first lower guide groove 1213 are in communication with each other, and the opening is formed by a first installation surface 1212a and a second installation surface 1212b of the first extended part 1215. The first installation surface 1212a and the second installation surface 1212b are concavely formed to correspond to a pair of inclined surfaces 1231 and 1233 of a guide protrusion 1230, respectively, and the guide protrusion 1230, which is one side of the lens carrier 1130, is convexly formed by the pair of inclined surfaces 1231 and 1233, such that the base part 1110 and the lens carrier 1130 have a structure in which they are engaged with each other. Therefore, portions of the lens carrier 1130 and portions of the base part 1110 are coupled to each other in a ruggedness form. The lens carrier guide part 1200 in which ball bearings 1251 and 1252 to be described below may be driven is formed by coupling between the base part 1110 and the lens carrier 1130.

The second guide groove 1220 includes a second extended part 1225 formed at the center thereof, and a space of the second guide groove 1220 is partitioned into upper and lower spaces by the second extended part 1225, such that a second upper guide groove 1222 and a second lower guide groove 1223 are formed.

The side part 1120 is coupled to the body 1111 to form one side surface of the base part 1110. The pair of coupling grooves 1125a and 1125b are formed at both sides of the side part 1120, respectively. A first yoke 1153, which is a portion of an auto-focusing driving part 1150 to be described below, is mounted between the coupling grooves 1125a and 1125b of the side part 1120.

The lens carrier 1130 is installed in the space part S of the base part 1110 to be movable forward and backward in an optical axis direction (a Z-axis direction), and is formed of a frame forming an approximately closed loop to surround the lens part 1180. A second light passing hole 1141 through which light may be incident may be formed in the center of the lens carrier 1130. The light amount adjustment driving part 1170 may be mounted on one side surface of an inner side of the lens carrier 1130, and a first lens module 1181 and a second lens module 1183 may be formed along the optical axis, which is the center of the lens carrier 1130.

The lens carrier 1130 moves the first lens module 1181 and the second lens module 1183 of the lens part 1180 forward and backward in the optical axis direction by the auto-focusing driving part 1150.

The guide protrusion 1230 and a guide surface 1240 of the lens carrier guide part 1200 are disposed at one side of the lens carrier 1130 to be symmetrical to each other with respect to the optical axis. The guide protrusion 1230 may be formed in a wedge shape, and has the pair of inclined surfaces 1231 and 1233 formed to be in contact with ball bearings 1251 of a lens carrier guide part 200 to be described below. The guide surface 1240 is formed as a plane to be in contact with ball bearings 1252 of a lens carrier guide part 1200 to be described below. The lens carrier 1130 is coupled to the body 1111, such that the guide protrusion 1230 partitions a space of the first guide groove 1210 into four spaces, and the guide surface 1240 partitions a space of the second guide groove 1220 into two spaces. In this case, the plurality of ball bearings 1251 and 1252 are slidably inserted into the first guide groove 1210 and the second guide groove 1220 to be in contact with the guide protrusion 1210 or the guide surface 1240 in the partitioned spaces, respectively.

Since the guide protrusion 1230 is formed to be inclined, a portion of the lens carrier 1130, that is, a portion of the lens carrier 1130 in which the guide protrusion 1230 is formed may be inserted into the first guide groove 1210 of the base part 1110. As described above, a structure in which a portion of the lens carrier 1130 is inserted into the base part 1110 is an approximately ruggedness structure. In this case, a pair of installation surfaces 1212a and 1212b inclined to face the pair of inclined surfaces 1231 and 1233 of the guide protrusion 1230 of the lens carrier 1130 are formed in the first guide groove 1210 of the base part 1110.

A coupling groove 1134 in which a first magnet 1151 to be described below is installed is formed between the guide protrusion 1230 and the guide surface 1240 of the lens carrier 1130.

The auto-focusing driving part 1150 is disposed between the lens carrier 1130 and the side part 1120 of the base part 1110, and moves the lens carrier 1130 in a forward direction and a backward direction by a predetermined distance through electromagnetic force. The auto-focusing driving part 1150 includes the first magnet 1151, a first coil 1153, and the first yoke 1155.

The first magnet 1151 is disposed on one side surface of the lens carrier 1130, and is configured to correspond to an outer circumference of the lens carrier 1130 between the guide protrusion 1230 and the guide surface 1240. In this case, the first magnet 1151 has a predetermined length, and has N poles and S poles magnetized on inner and outer peripheral surfaces of one side and the other side thereof, respectively. That is, the N pole and the S pole may be magnetized, respectively, at one side and the other side of a surface of the first magnet 1151 facing the coil, and the S pole and the N pole may be magnetized, respectively, at one side and the other side of an opposite surface to the surface described above. As described above, the N poles and the S poles are magnetized as four poles on the inner and outer peripheral surfaces of both sides of the first magnet 1151, respectively, to form a magnetic section in which strength of magnetic force sensed by an auto-focusing hall sensor 1163 (see FIG. 11A) is approximately uniformly increased or decreased.

The first coil 1153 is disposed an inner side of the side part 1120 to face the first magnet 1151, and is fixedly installed simultaneously with being electrically connected to an FPCB (not illustrated) for the auto-focusing driving part 1150.

The first yoke 1155 is disposed behind the first coil 1153, and is fixed to the side part 1120. The first yoke 1155 is formed to have a width slightly larger than that of the first coil 1153, and may thus increase strength of a magnetic field formed between the first coil 1153 and the first magnet 1151 and expand the magnetic field.

Meanwhile, the auto-focusing hall sensor 1163 is mounted on the FPCB (not illustrated). The auto-focusing hall sensor 1163 is disposed to be adjacent to and be spaced apart from an outer peripheral surface of the first magnet 1151, and is electrically connected to the FPCB (not illustrated).

The light amount adjustment driving part 1170 is disposed in the lens carrier 1130, and includes a second magnet 1173 having a circular shape, second coils 1175*a* and 1175*b* disposed at both sides of the second magnet 1173, respectively, and a driving arm 1171 coupled to one surface of the second magnet 1173 while forming a concentric axis with the second magnet 1173. In this case, the second coils 1175*a* and 1175*b* are wound around yokes 1176*a* and 1176*b*, respectively.

The camera lens assembly according to another exemplary embodiment of the present disclosure separately includes the auto-focusing driving part 1150 for auto-focusing and the light amount adjustment driving part 1170 for optical amount adjustment. The camera lens assembly according to another exemplary embodiment of the present disclosure includes the auto-focusing driving part 1150 and the light amount adjustment driving part 1170 as separate components, such that magnetic field interference between the auto-focusing driving part 1150 and the light amount adjustment driving part 1170 may be prevented. The auto-focusing driving part 1150 may be disposed at one side of the camera lens assembly, and the light amount adjustment driving part 1170 may be disposed at the other side of the camera lens assembly opposing to one side of the camera lens assembly. Preferably, the auto-focusing driving part 1150 and the light amount adjustment driving part 1170 may be disposed to face each other to prevent the magnetic field interference therebetween.

The aperture stop 1179 includes a first blade 1179*a* and a second blade 1179*b*, and portions of the first and second blades 1179*a* and 1179*b* are hinge-connected to the driving arm 1171. Therefore, the first and second blades 1179*a* and 1179*b* adjust a region through which light passes to be increased or decreased while being linearly driven in a direction (a Y-axis direction) perpendicular to the optical axis when the driving arm 1171 rotates in a clockwise direction and a counterclockwise direction. The aperture stop 1179 may be slidably supported by a cover (not illustrated) coupled to the lens carrier 1130. The aperture stop 1179 may be positioned between the first lens module 1181 and the second lens module 1183 and be disposed in the lens carrier 1130.

The lens part 1180 may include the first lens module 1181 and the second lens module 1183 fixedly installed in the lens carrier 1130 and moving forward and backward in the optical axis direction (the Z-axis direction) together with the lens carrier 1130. The lens part 1180 may be formed so that the first and second blades 179*a* and 179*b* are disposed between the first lens module 1181 and the second lens module 1183.

The carrier cover 1195 is to cover one side surface of the lens carrier 1130, and a light passing hole through which the light may be incident to the lens part 1180 may be formed in one surface of the carrier cover 1195.

A first light passing hole 1191 through which the light may be incident to the lens part 1180 may be formed in one surface of the shield can 1190.

The lens carrier guide part 1200 may include the first guide groove 1210 and the second guide groove 1220 of the base part 1110, the guide protrusion 1230 and the guide surface 1240 of the lens carrier 1130 coupled to the first guide groove 1210 and the second guide groove 1220, respectively, and the plurality of ball bearings 1251 and 1252 rotatably installed between the base part 1110 and the lens carrier 1130.

A plurality of ball bearings 1251 are inserted into a space partitioned by coupling between the first guide groove 1210 and the guide protrusion 1230, and a plurality of ball bearings 1252 are inserted into a space partitioned by coupling between the second guide groove 1220 and the guide surface 1240. The plurality of ball bearings 1251 and 1252 are in slidable contact with the first guide groove 1210 and the second guide groove 1220 of the body 1111, respectively. The plurality of ball bearings 1251 and 1252 of the lens carrier guide part 1200 is in slidable contact with the base part 1110 at positions symmetric to each other with respect to the center of the inner side of the lens carrier 1130 to act so that they are uniformly supported by the entirety of the first and second guide grooves 1210 and 1220, the guide protrusion 1230, and the guide surface 1240 when the lens carrier 1130 is vertically driven with respect to the base part 1110.

Figure 10:
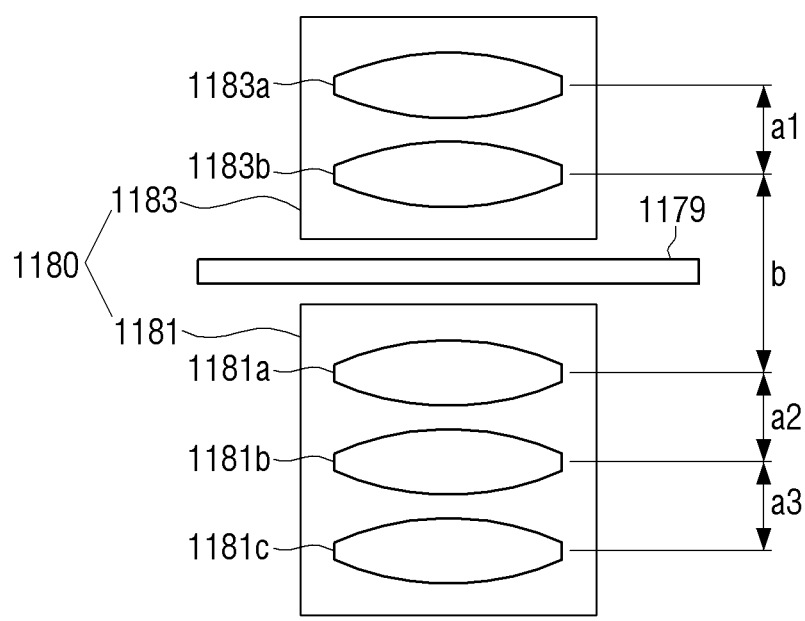
FIG. 10 is a side cross-sectional view schematically illustrating an inner structure and an aperture stop of a lens part of the camera lens assembly according to another exemplary embodiment of the present disclosure.

FIG. 10 is a side cross-sectional view schematically illustrating an inner structure and an aperture stop of a lens part of the camera lens assembly according to another exemplary embodiment of the present disclosure.

Referring to FIG. 10, the first and second lens modules 1181 and 1183 of the lens part 1180 may include a plurality of lenses. As an example, the lens part 1110 may include five lenses. The lens part 1180 includes a first lens 1183*a*, a second lens 1183*b*, a third lens 1181*a*, a fourth lens 1181*b*, and a fifth lens 1181*c* sequentially arranged from the shield can 1190. In detail, the second lens module 1183 may have a configuration in which the first lens 1183*a* and the second 1183*b* are disposed with a predetermined distance therebetween, and the first lens module 1181 may have a structure in which the third lens 1181*a*, the fourth lens 1181*b*, and the fifth lens 1181*c* are disposed with predetermined distances therebetween. The aperture stop 1179 is disposed between the first lens module 1181 and the second lens module 1183. In detail, the aperture stop 1179 is disposed between the second lens 1183*b* and the third lens 1181*a*. A case in which the first and second lens modules 1181 and 1183 include two lenses and three lenses, respectively, is described in FIG. 10.

However, the numbers of lenses included in the first and second lens modules 1181 and 1183 are not limited thereto, but may be variously set.

A distance from the center of the first lens 1183a to the center of the second lens 1183b is a1 and a distance from the center of the second lens 1183b to the center of the third lens 1181a is b, a distance from the center of the third lens 1181a to the center of the fourth lens 1181b is a2, and a distance from the center of the fourth lens 1181b to the center of the fifth lens 1181c is a3. a1, a2, and a3, which are distances between the lenses in the optical axis direction, may be the same as or different from each other. In this case, the distance b from the center of the second lens 1183b to the center of the third lens 1181 from the center of the second lens 1183b to the center of the third lens 1181a may be set to be larger than the distances a1, a2, and a3 between the other lenses so that the aperture stop 179 may be disposed between the second lens 1183b and the third lens 1181a. The distance b between the second and third lenses 1183a and 1181a between which the aperture stop 179 is disposed may be set to be larger than the distances a1, a2, and a3 between the other lenses adjacent to each other. A case in which the first and second lenses 1183a and 1183b and the third, fourth, and fifth lenses 1181a, 1181b, and 1181c have the same shapes is illustrated in FIG. 10. However, the shapes of the lenses are not limited thereto, but may be various shapes to be appropriate for functions performed depending on positions at which the lenses are disposed.

Figure 11A:
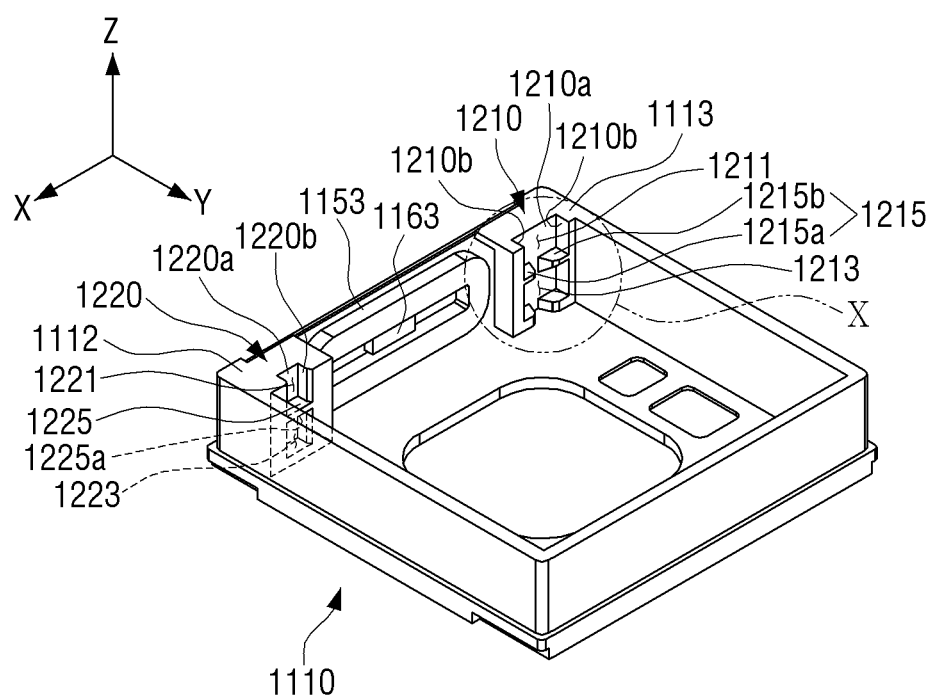
FIG. 11A is a perspective view illustrating the camera lens assembly in a state in which a shield can and a carrier cover illustrated in FIG. 8 are omitted.
Figure 11B:
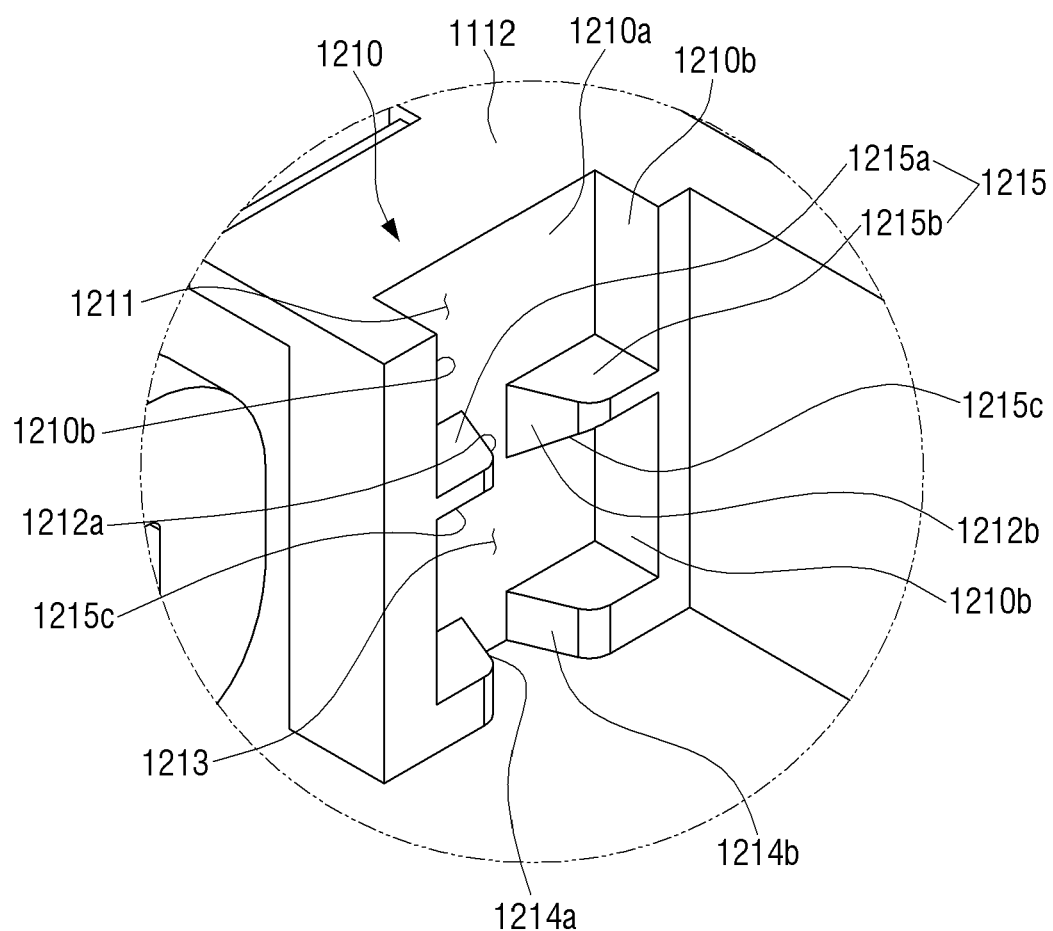
FIG. 11B is an enlarged view of part X illustrated in FIG. 11A.

FIG. 11A is a perspective view illustrating the camera lens assembly in a state in which a shield can and a carrier cover illustrated in FIG. 8 are omitted, and FIG. 11B is an enlarged view of part X illustrated in FIG. 11A.

Referring to FIG. 11A, the first guide groove 1210 and the second guide groove 1220 into which the ball bearings 1251 and 1252 are slidably inserted, respectively, are formed at one side of the base part 1110. The first and second guide grooves 1210 and 1220 and the guide protrusion 1230 and the guide surface 1240 of the lens carrier 1130 are coupled to each other, respectively. The plurality of ball bearings 1251 and 1252 disposed, respectively, in spaces formed by the coupling described above slidably support the lens carrier 1130 to guide the lens carrier 1130 so that the lens carrier 1130 may be stably driven forward.

A space of the second guide groove 1220 may be partitioned into upper and lower spaces by the second extended part 1225 formed at the center of the second guide groove 1220. The upper space may be called a second upper guide groove 1221, and the lower space may be called a second lower guide groove 1223. The second upper guide groove 1221 and the second lower guide groove 1223 may be formed by a front surface 1220a, both side surfaces 1220b, and the second extended part 1225 of the second guide groove 1220 and the guide surface 1240 of the lens carrier 1130.

A lower surface 1225a of the second extended part 1225 may be formed to have an inclination. Therefore, when a ball bearing 1252b moving in a sliding form in the second lower guide groove 1223 moves to the uppermost end in the optical axis direction (the Z-axis direction), the ball bearing 1252b is caught by the lower surface 1225a, such that upward movement of the ball bearing 1252b stops. The lower surface 1225a may fix the ball bearing 1252b.

Referring to FIG. 11B, the space of the first guide groove 1210 is partitioned into the upper and lower spaces by the first extended part 1215 formed at the center of the first guide groove 1210, such that the first upper guide groove 1211 and the first lower guide groove 1213. In this case, both sides 1215a and 1215b of the first extended part 1215 are formed to be spaced apart from each other so that the first upper guide groove 1211 and the first lower guide groove 1213 are in communication with each other. To insert the guide protrusion 1230 of the lens carrier 1130 into the first guide groove 1210 of the base part 1110, one side 1215a and the other side 1215b of the first extended part are spaced apart from each other, and the first and second installation surfaces 1212a and 1212b are formed in portions at which one side 1215a and the other side 1215b are spaced apart from each other to correspond to the pair of inclined surfaces 1231 and 1233 of the guide protrusion 1230 of the lens carrier 1130. In detail, the first installation surface 1212a is formed at one side 1215a of the first extended part 1215, and the second installation surface 1212b is formed at the other side 1215b of the first extended part 1215, such that the guide protrusion 1230 may be inserted between both sides 1215a and 1215b of the first extended part 1215. The first and second installation surfaces 1212a and 1212b are concavely formed to correspond to the first and second inclined surfaces 1231 and 1233, respectively. The first and second installation surfaces 1212a and 1212b and the first and second inclined surfaces 1231 and 1233 have a structure in which they are engaged with each other, respectively. Portions of the lens carrier 1130 and portions of the base part 1110 are coupled to each other in a ruggedness form. Due to the coupling having the ruggedness form, the lens carrier 1130 may be stably driven in X-axis and Y-axis directions at the time of being driven.

The first upper guide groove 1211 and the first lower guide groove 1213 may be formed by the front surface 1210a, both side surfaces 1210b, and the first extended part 1225 of the second guide groove 1210 and the guide protrusion 1230 of the lens carrier 1130.

Third and fourth installation surfaces 1214a and 1214b may be formed at a lower side of the first guide groove 1210. Similar to the first and second installation surfaces 1212a and 1212b, the third and fourth installation surfaces 1214a and 1214b are concavely formed to correspond to the pair of inclined surfaces 1231 and 1233 of the guide protrusion 1230 so that the guide protrusion 1230 may be inserted into the first guide groove 1210. The third and fourth installation surfaces 1214a and 1214b and the first and second inclined surfaces 1231 and 1233 have a structure in which they are engaged with each other, respectively. Therefore, portions of the base part 1110 and portions of the lens carrier 1130 are coupled to each other in a ruggedness form.

Due to a structure in which the first to fourth installation surfaces 1212a, 1212b, 1214a, and 1214b and the pair of inclined surfaces 1231 and 1233 of the lens carrier 1130 are formed to be inclined, the lens carrier 1130 may be driven along a predetermined path without being shaken in directions (the X-axis and Y-axis directions) perpendicular to the optical axis.

A lower surface 1215c of the first extended part 1215 may be formed to have an inclination, similar to the second extended part 1225 of the second guide groove 1220. Therefore, when ball bearings 1251c and 1251d moving in a sliding form in the first lower guide groove 1213 move to the uppermost end in the optical axis direction (the Z-axis direction), the ball bearings 1251c and 1251d are caught by the lower surface 1215c, such that upward movement of the ball bearings 1251c and 1251d stops. The lower surface 1215c may fix the ball bearings 1251c and 1251d.

Figure 12A:
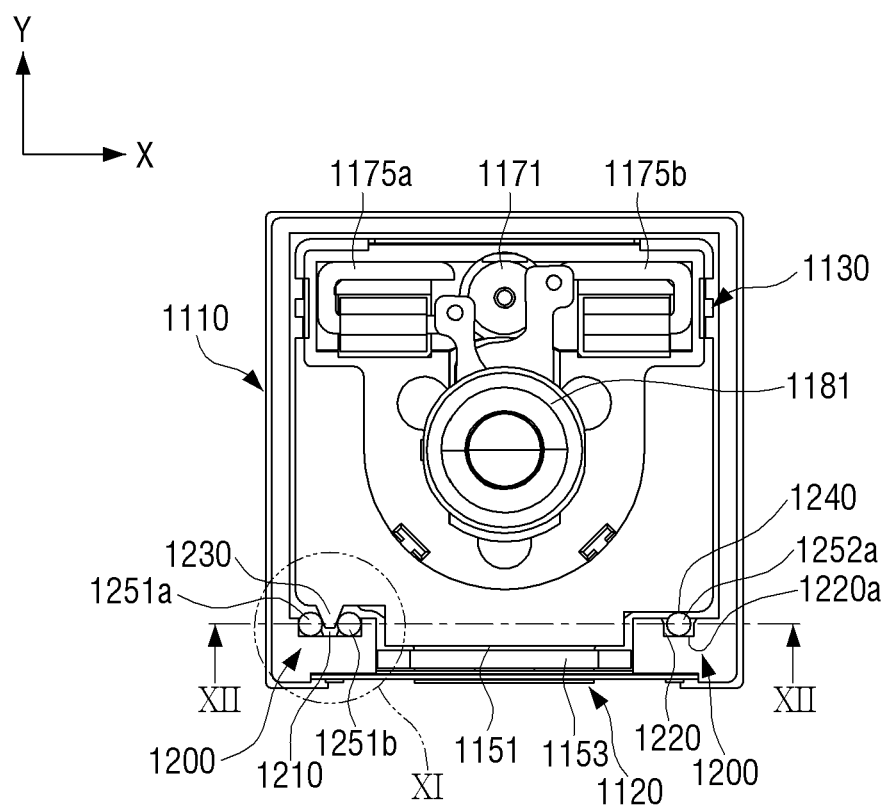
FIG. 12A is a plan view illustrating the camera lens assembly in a state in which a shield can and a carrier cover illustrated in FIG. 8 are omitted.
Figure 12B:
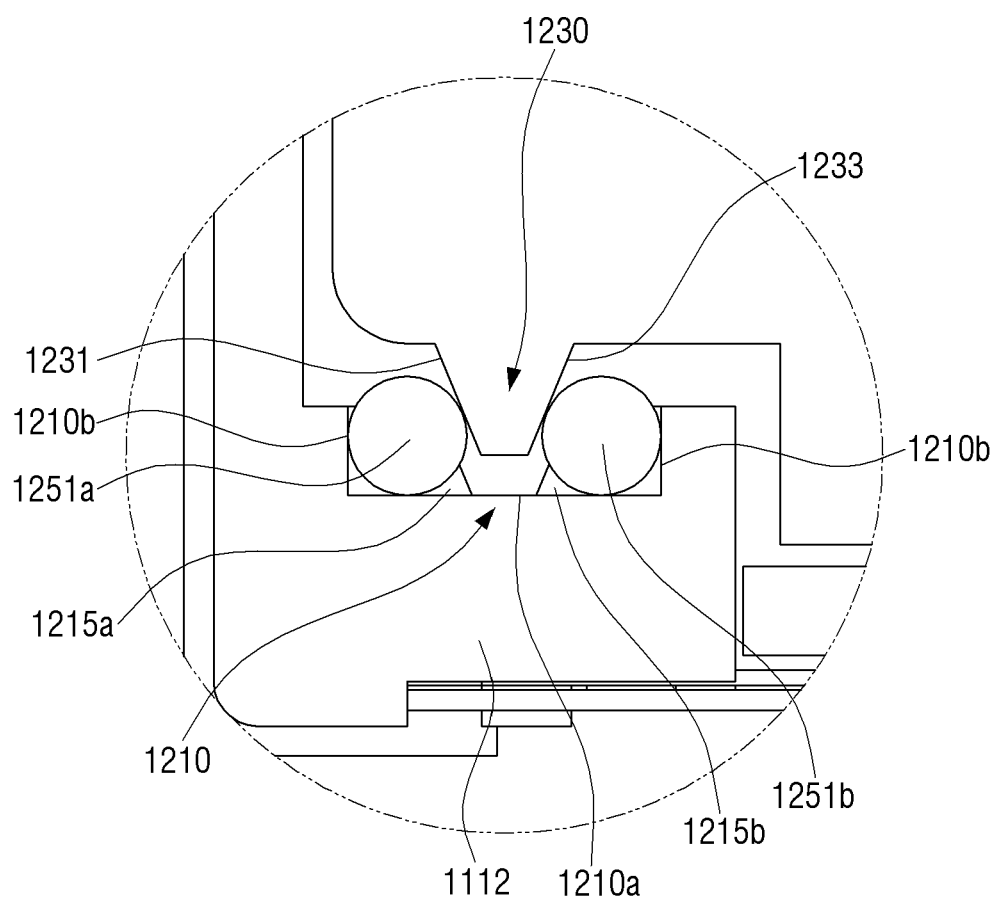
FIG. 12B is an enlarged view of part XI illustrated in FIG. 12A.

FIG. 12A is a plan view illustrating the camera lens assembly in a state in which a shield can and a carrier cover illustrated in FIG. 8 are omitted, and FIG. 12B is an enlarged view of part XI illustrated in FIG. 12A.

Spaces in which the ball bearings 1251 and 1252 are accommodated are partitioned and formed by coupling between the lens carrier 1130 and the base part 1110. The first guide groove 1210 and the guide protrusion 1230 are coupled to each other in a ruggedness form in a structure in which they are engaged with each other, and the second guide groove 1220 is coupled to the guide surface 1240 in a plane form.

Referring to FIG. 12A, the ball bearings 1251 and 1252 are disposed at the portions coupled to each other in the ruggedness form and the portions coupled to each other in the plane form, respectively, and guide the lens carrier 1130 so that the lens carrier 1130 is driven forward and backward in the optical axis direction. The ball bearings 1251a and 1252b are slidably inserted into the second upper guide groove 1222 and the second lower guide groove 1223, respectively. When the lens carrier 1130 is driven forward and backward, the ball bearings 1252a and 1252b are in contact with the guide surface 1240 of the lens carrier 1130 to be slid in a vertical direction with respect to the front surface 1220a of the second guide groove 1220.

In addition, one sides of the plurality of ball bearings 1252 inserted into the second guide groove 1220 are slidably disposed on the guide surface 1240 of the lens carrier 1130, and the other sides thereof are in slidable contact with the front surface 1220a of the second guide groove 1220 of the base part 1110.

In addition, when the lens carrier 1130 is driven forward and backward, the plurality of ball bearings 1252a and 1252b are slidably inserted into the second guide groove 1220 of the base part 1110 and the guide surface 1240 of the lens carrier 1130, such that the lens carrier 1130 may be guided to be accurately driven forward and backward in the optical axis direction.

Referring to FIG. 12B, portions of the lens carrier 1130 and the body 1111, which is a portion of the base part 1110, are coupled to each other in a ruggedness form, and the plurality of ball bearings 1251 are disposed at the portions coupled to each other in the ruggedness form. The first guide groove 1210 may be partitioned into four spaces by coupling the lens carrier 1130 and the base part 1110 to each other in the ruggedness form. The guide protrusion 1230 of the lens carrier 1130 is coupled between one side 1215a and the other side 1215b of the first extended part 1215, which is the center of the first guide groove 1210, such that spaces of the first upper guide groove 1211 and the first lower guide groove 1213 are partitioned into left and right spaces, respectively. The ball bearings 1251a, 1251b, 1251c, and 1251d are slidably inserted, respectively, into four spaces partitioned from the first upper guide groove 1211 and the first lower guide groove 1213. When the lens carrier 1130 is driven forward or backward, the ball bearings 1251a, 1251b, 1251c, and 1251d are in contact with the inclined surfaces 1231 and 1233 of the guide protrusion 1230 of the lens carrier 1130 to be slid in the vertical direction (the Z-axis direction) with respect to the front surface 1210a and the side surfaces 1210b of the first guide groove 1210.

Due to a structure in which the pair of inclined surfaces 1231 and 1233 of the guide protrusion 1230 and the pair of installation surfaces 1212a and 1212b are formed to be inclined, when the lens carrier 1130 is slid in the optical axis direction, the ball bearings 1251 are in contact with the guide protrusion 1230 to guide the lens carrier 1130, and may thus prevent sliding that may be generated in the directions (the X-axis and Y-axis directions) perpendicular to the optical axis.

The pair of inclined surfaces 1231 and 1233 of the guide protrusion 1230 of the lens carrier 1130 are formed to be inclined, and are disposed to be symmetrical to each other with respect to the optical axis. Meanwhile, the pair of installation surfaces 1212a and 1212b inclined to face the pair of inclined surfaces 1231 and 1233 of the lens carrier 1130 are disposed in the first guide groove 1210 of the body 1111 of the base part 1110 coupled to the lens carrier 1130 in the ruggedness form. Due to a structure in which the pair of installation surfaces 1212a and 1212a of the base part 1111 and the pair of inclined surfaces 1231 and 1233 of the guide protrusion 1230 of the lens carrier 1130 are formed to be inclined as described above, the lens carrier 1231 may be driven along a predetermined path without being shaken in the directions (X-axis and Y-axis directions) perpendicular to the optical axis. Therefore, the lens carrier 1130 may stably perform driving in the forward direction and the backward direction in spite of manufacturing tolerances of the respective components.

The plurality of ball bearings 1251 and 1252 are positioned between the lens carrier 1130 and the base part 1110, and guide forward movement and backward movement of the lens carrier 1130.

The plurality of ball bearings 1251 inserted into the first guide groove 1210 may be in point contact with three points. In detail, one side of the ball bearing 1251a is slidably disposed on the inclined surface 1231 of the guide protrusion 1230 of the lens carrier 1130, and the other sides thereof are in slidable contact with the side surface 1210b and the front surface 1210a of the first guide groove 1210 of the base part 1110, respectively. In this case, one sides of the plurality of ball bearings 1251 may be in point contact with the inclined surfaces 1231 and 1233 of the guide protrusion 1230, another sides thereof may be maintained in a state in which they are in point contact with the front surface 1210a of the first guide groove 1210, and the other sides thereof may be maintained in a state in which they are in point contact with the side surfaces 1210b of the first guide groove 1210.

In addition, the plurality of ball bearings 1252 inserted into the second guide groove 1220 may be in point contact with two points. In detail, one side of the ball bearing 1252a may be in point contact with the guide surface 1240 of the lens carrier 1130, and the other side thereof may be maintained in a state in which it is in point contact with the front surface 1220a of the second guide groove 1220.

Therefore, the lens carrier 1130 may be smoothly driven in the forward direction and the backward direction inside the space part S of the base part 1110 by the plurality of ball bearings 1251 and 1252, and may be stably driven without being shaken in the directions (the X-axis and Y-axis directions) perpendicular to the optical axis at the time of being driven.

Figure 13A:
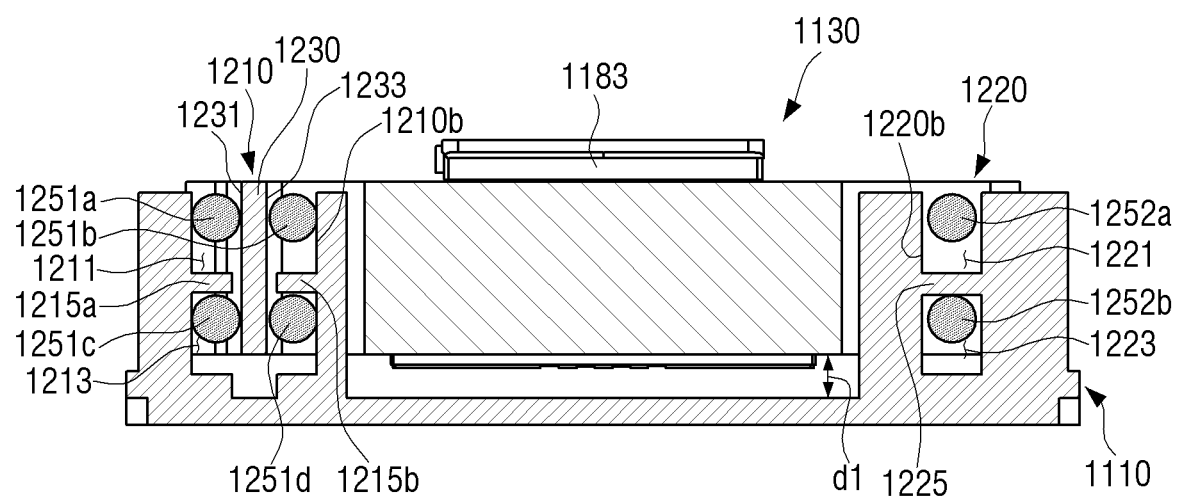
FIGS. 13A and 13B, which are cross-sectional views taken along line XII-XII of FIG. 12A, illustrate a forward movement state and a backward movement state of a lens carrier, respectively.
Figure 13B:
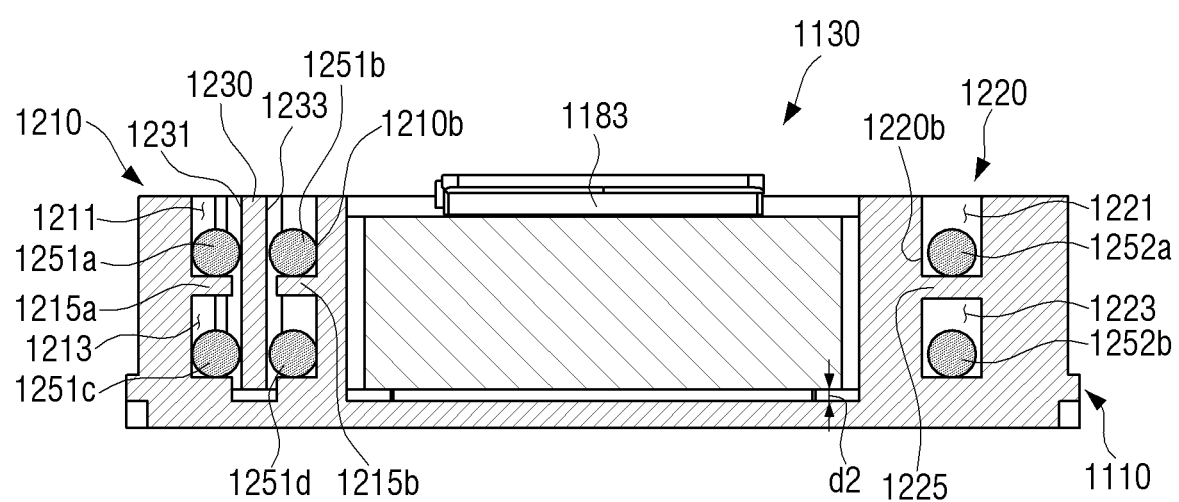

Hereinafter, forward movement and backward movement operations of the lens carrier by the auto-focusing part of the camera lens assembly according to another exemplary embodiment of the present disclosure configured as described above are described with reference to FIGS. 13A and 13B. FIGS. 13A and 13B, which are cross-sectional views taken along line XII-XII of FIG. 12A, illustrate a forward movement state and a backward movement state of a lens carrier, respectively.

First, referring to FIG. 13A, in the case of a forward movement operation of the lens carrier, when a current is applied to the first coil 1153 of the auto-focusing driving part 1150 on one direction, electromagnetic force is generated between the first magnet 1151 and the first coil 1153, such that the first magnet 1151 is pushed in the forward direction. Therefore, the lens carrier 1130 is driven forward in the optical axis direction. The lens carrier 1130 is driven forward, such that a distance d1 between one surface of the base 1110 and one surface of the lens carrier 1130 facing one surface of the base 1110 is increased. In this case, the plurality of ball bearings 1251 and 1252 slidably support the lens carrier 1130 to guide the lens carrier 1130 so that the lens carrier 130 may be stably driven forward. In this case, the auto-focusing hall sensor 1163 senses strength of magnetic force of the first magnet 1151 changed depending on a change in a position of the first magnet 1151, and transmits a sensed signal to a controller (not illustrated) of a portable device (not illustrated) in which the camera lens assembly 1000 is installed.

The controller may control a forward movement distance d of the lens carrier 1130 through the sensed signal of the auto-focusing hall sensor 1163. For example, when the forward movement distance of the lens carrier 1130 is set, a current applied to the first coil 1153 of the auto-focusing driving part 1150 is controlled. In this case, the lens carrier 1130 stops in place, and does not move forward or backward.

Meanwhile, referring to FIG. 13B, in the case of a backward movement operation of the lens carrier, a current is applied to the first coil 1153 in a reverse direction to a direction in which it is applied to the first coil 1153 at the time of the forward movement operation of the lens carrier, such that electromagnetic force is generated in an opposite direction to a direction at the time of forward movement of the lens carrier between the first coil 1153 and the first magnet 1151. Therefore, the first magnet 1151 is pushed in the backward direction as opposed to the forward movement operation of the lens carrier. Therefore, the lens carrier 1130 is driven backward. The lens carrier 1130 is driven backward, such that a distance d2 between one surface of the base 1110 and one surface of the lens carrier 1130 facing one surface of the base 1110 is decreased. Also in this case, the lens carrier is slidably supported by the plurality of ball bearings 1251 and 1252, such that it may be stably driven backward. Also at the time of the backward movement of the lens carrier 1130, when the current applied to the first coil 1153 is controlled, the lens carrier 1130 may stop in place.

When the lens carrier 1130 is driven forward and backward for short and long distance focuses as described above, the lens carrier 1130 is slidably guided with respect to the base part 1110 by the plurality of ball bearings 1251 and 1252. As described above, the plurality of ball bearings 1251 may be supported in a state in which they are in contact with the pair of inclined surfaces 1231 and 1233 of the guide protrusion 1230, resulting in prevention of shaking due to external impact or various vibrations. In addition, the ball bearings 1251 and 1252 may stably guide the lens carrier 1130 so that the lens carrier 130 is stably driven forward and backward due to a structure in which they are in contact with a plurality of surfaces.

An operation of the aperture stop of the camera lens assembly according to another exemplary embodiment of the present disclosure configured as described above is the same as that of the aperture stop of the camera lens assembly according to an exemplary embodiment of the present disclosure.

Figure 14:
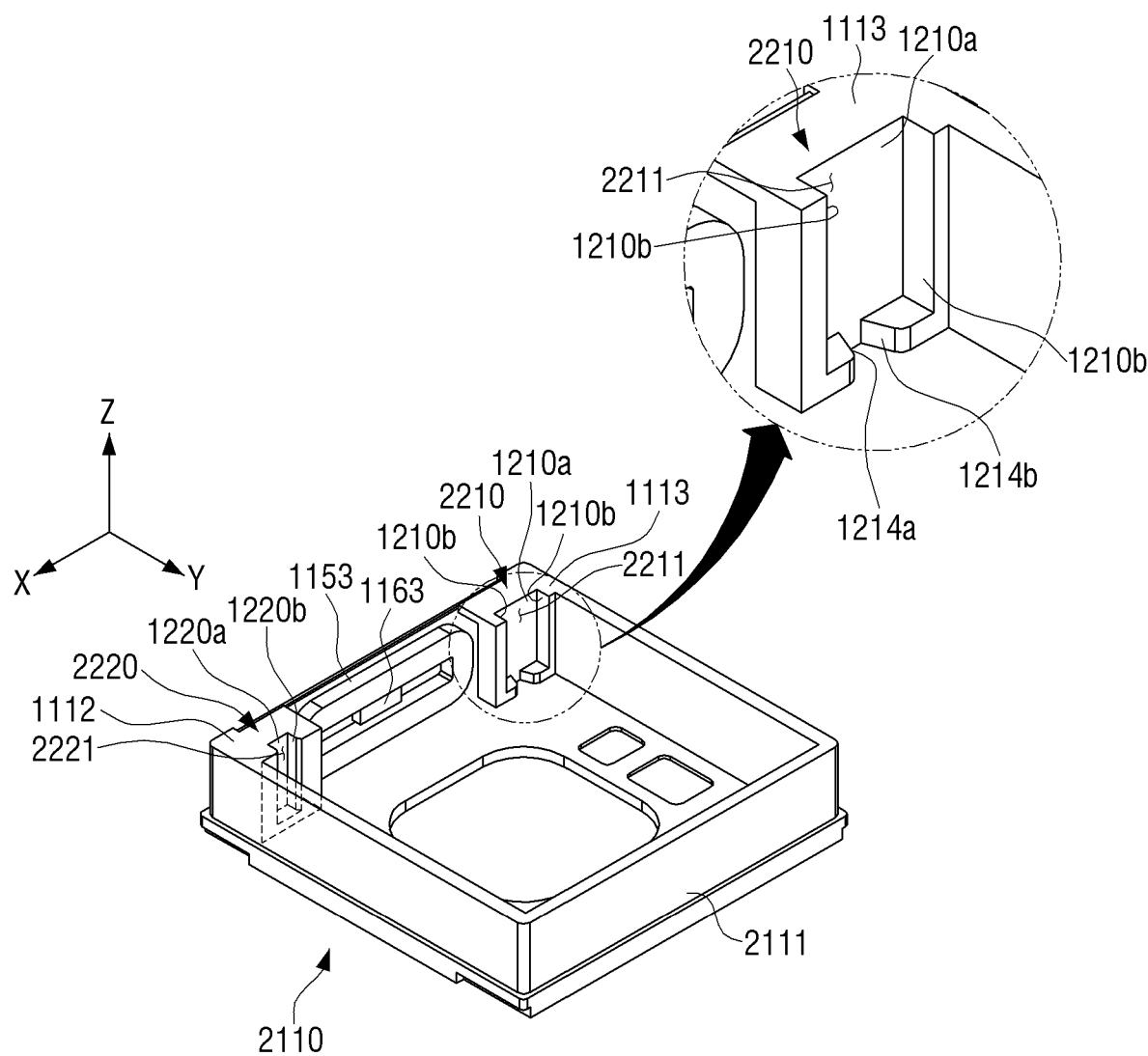
FIG. 14 is a view illustrating a modified example of a base part according to another exemplary embodiment of the present disclosure illustrated in FIGS. 11A and 11B.

FIG. 14 is a view illustrating a modified example of a base part according to another exemplary embodiment of the present disclosure illustrated in FIGS. 11A and 11B. Hereinafter, portions different from those of the camera lens assembly according to another exemplary embodiment of the present disclosure described with reference to FIGS. 8 to 13B are mainly described. A description and reference numerals that are omitted may be replaced by contents of the camera lens assembly according to another exemplary embodiment of the present disclosure described above.

Referring to FIG. 14, a first guide groove 2210 and a second guide groove 2220 into which ball bearings 1251 and 1252 are slidably inserted, respectively, are formed at one side of a base part 2110 according to another exemplary embodiment of the present disclosure.

Although not illustrated, as described above, the first and second guide grooves 2210 and 2220 and the guide protrusion 1230 and the guide surface 1240 of the lens carrier 1130 may be coupled to each other, respectively. The plurality of ball bearings 1251 and 1252 disposed, respectively, in spaces formed by the coupling described above slidably support the lens carrier 1130 to guide the lens carrier 1130 so that the lens carrier 1130 may be stably driven forward.

Third and fourth installation surfaces 1214a and 1214b may be formed at a lower side of the first guide groove 2210. The third and fourth installation surfaces 1214a and 1214b are concavely formed to correspond to the pair of inclined surfaces 1231 and 1233 of the guide protrusion 1230 so that the guide protrusion 1230 may be inserted into the first guide groove 2210. The third and fourth installation surfaces 1214a and 1214b and the first and second inclined surfaces 1231 and 1233 have a structure in which they are engaged with each other, respectively. Therefore, portions of the base part 2110 and portions of the lens carrier 1130 are coupled to each other in a ruggedness form.

That is, due to a structure in which the third and fourth installation surfaces 1214a and 1214b and the pair of inclined surfaces 1231 and 1233 of the lens carrier 1130 are formed to be inclined, the lens carrier 1130 may be driven along a predetermined path without being shaken in the directions (the X-axis and Y-axis directions) perpendicular to the optical axis.

In this case, portions of the lens carrier 1130 and a body 2111, which is a portion of the base part 2100, are coupled to each other in a ruggedness form, and the plurality of ball bearings 1251 are disposed at the portions coupled to each other in the ruggedness form. The first guide groove 2210 may be partitioned into left and right spaces by coupling the lens carrier 1130 and the base part 2110 to each other in the ruggedness form. The first ball bearings 1251 are slidably inserted, respectively, into the left and right spaces partitioned from the first guide groove 2210.

Three bell bearings 1251a, 1251b, and 1251c and 1251d, 1251e, and 1251f may be mounted, respectively, in the left and right spaces partitioned from the first guide groove 2210 by the lens carrier 1130. That is, the plurality of ball bearings 1251 are inserted into spaces partitioned by coupling between the first guide groove 2210 and the guide protrusion 1230.

In addition, the plurality of ball bearings 1252 are inserted into spaces partitioned by coupling between the second guide groove 2220 and the guide surface 1240. Three ball bearings 1252a, 1252b, and 1252c may be mounted in the second guide groove 2220.

The plurality of ball bearings 1251 and 1252 are in slidable contact with the first guide groove 2210 and the second guide groove 2220 of the body 2111, respectively. The plurality of ball bearings 1251 and 1252 of the lens carrier guide part 1200 is in slidable contact with the base part 2110 at positions symmetric to each other with respect to the center of the inner side of the lens carrier 1130 to act so that they are uniformly supported by the entirety of the first and second guide grooves 2210 and 2220, the guide protrusion 1230, and the guide surface 1240 when the lens carrier 1130 is vertically driven with respect to the base part 2110.

That is, the base part 2100 according to another exemplary embodiment of the present disclosure may further include the ball bearings 1251e, 1251f, and 1252c without the first and second extended parts 1215 and 1225 partitioning spaces between the ball bearings 1251 and 1252 into upper and lower spaces. As a result, a structure of the component may be simplified to improve precision of the guide surface 1240, and it is easy to insert the ball bearings 1251 and 1252 in an assembling process.

Figure 15A:
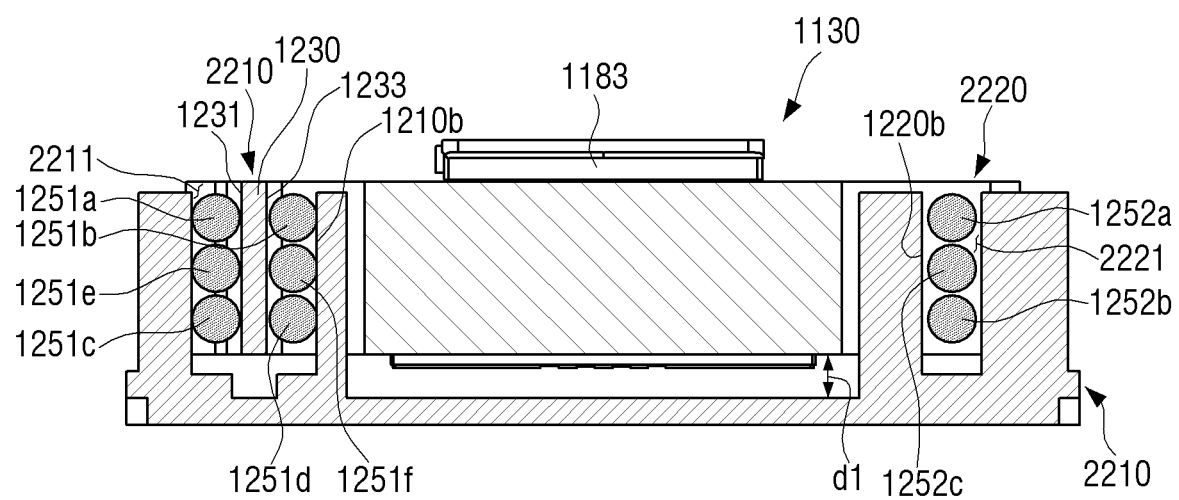
FIGS. 15A and 15B are cross-sectional views illustrating a forward movement state and a backward movement state of a lens carrier illustrated in FIG. 14, respectively.
Figure 15B:
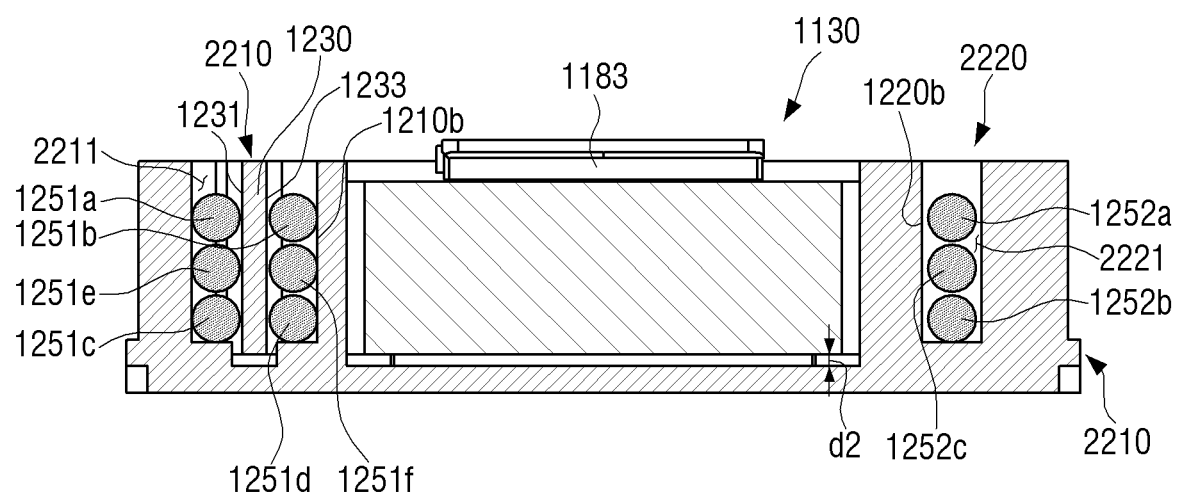

FIGS. 15A and 15B are cross-sectional views illustrating a forward movement state and a backward movement state of a lens carrier illustrated in FIG. 14, respectively. In detail, FIG. 15A is a cross-sectional view illustrating the forward movement state of the lens carrier, and FIG. 15B is a cross-sectional view of the backward movement state of the lens carrier.

Referring to FIG. 15A, in the case of a forward movement operation of the lens carrier, when a current is applied to the first coil 1153 of the auto-focusing driving part 1150 on one direction, electromagnetic force is generated between the first magnet 1151 and the first coil 1153, such that the first magnet 1151 is pushed in the forward direction. Therefore, the lens carrier 1130 is driven forward in the optical axis direction. The lens carrier 1130 is driven forward, such that a distance d1 between one surface of the base 2110 and one surface of the lens carrier 1130 facing one surface of the base 1110 is increased. In this case, the plurality of ball bearings 1251 and 1252 slidably support the lens carrier 1130 to guide the lens carrier 1130 so that the lens carrier 130 may be stably driven forward. In this case, the auto-focusing hall sensor 1163 senses strength of magnetic force of the first magnet 1151 changed depending on a change in a position of the first magnet 1151, and transmits a sensed signal to a controller (not illustrated) of a portable device (not illustrated) in which the camera lens assembly 1000 is installed.

The controller may control a forward movement distance d of the lens carrier 1130 through the sensed signal of the auto-focusing hall sensor 1163. For example, when the forward movement distance of the lens carrier 1130 is set, a current applied to the first coil 1153 of the auto-focusing driving part 1150 is controlled. In this case, the lens carrier 1130 stops in place, and does not move forward or backward.

Meanwhile, referring to FIG. 15B, in the case of a backward movement operation of the lens carrier, a current is applied to the first coil 1153 in a reverse direction to a direction in which it is applied to the first coil 1153 at the time of the forward movement operation of the lens carrier, such that electromagnetic force is generated in an opposite direction to a direction at the time of forward movement of the lens carrier between the first coil 1153 and the first magnet 1151. Therefore, the first magnet 1151 is pushed in the backward direction as opposed to the forward movement operation of the lens carrier. Therefore, the lens carrier 1130 is driven backward. The lens carrier 1130 is driven backward, such that a distance d2 between one surface of the base 2110 and one surface of the lens carrier 1130 facing one surface of the base 2110 is decreased. Also in this case, the lens carrier is slidably supported by the plurality of ball bearings 1251 and 1252, such that it may be stably driven backward. Also at the time of the backward movement of the lens carrier 1130, when the current applied to the first coil 1153 is controlled, the lens carrier 1130 may stop in place.

When the lens carrier 1130 is driven forward and backward for short and long distance focuses as described above, the lens carrier 1130 is slidably guided with respect to the base part 2110 by the plurality of ball bearings 1251 and 1252. As described above, the plurality of ball bearings 1251 may be supported in a state in which they are in contact with the pair of inclined surfaces 1231 and 1233 of the guide protrusion 1230, resulting in prevention of shaking due to external impact or various vibrations. In addition, the ball bearings 1251 and 1252 may stably guide the lens carrier 1130 so that the lens carrier 130 is stably driven forward and backward due to a structure in which they are in contact with a plurality of surfaces.

An operation of the aperture stop of the camera lens assembly according to a modified example of the present disclosure configured as described above is the same as that of the aperture stop of the camera lens assembly according to an exemplary embodiment of the present disclosure.

Although the present disclosure has been described hereinabove with reference to exemplary embodiments and the drawings, the present disclosure is not limited thereto, but may be variously modified and altered by those skilled in the art to which the present disclosure pertains without departing from the spirit and scope of the present disclosure defined in the claims.

The invention claimed is:

1. A camera lens assembly comprising:
   a lens;
   a base having a concave portion;
   a lens carrier having a convex portion and that moves the lens forward and backward in an optical axis direction of the camera lens assembly, wherein the lens carrier is disposed on the base and slides in the optical axis direction;
   an auto-focusing driving part having one portion disposed on the base and another portion disposed in the lens carrier to drive the lens carrier forward and backward in the optical axis direction using electromagnetic force; and
   a lens carrier guide that supports needle bearings, wherein
   the convex portion of the lens carrier fits with the concave portion of the base,
   the needle bearings are disposed between the convex portion of the lens carrier and the concave portion of the base,
   the base comprises:
     a body with a space in which the lens carrier is disposed; and
     a side part that is detachably snapped on to one side of the body,
   one side of the lens carrier comprises a pair of symmetrical installation surfaces that each comprises recessed grooves into which the needle bearings are inserted,
   the side part of the base comprises:
     a pair of inclined surfaces that face the pair of symmetrical installation surfaces of the lens carrier; and
     a pair of coupling grooves into which a pair of coupling protrusions of the base are snapped into,
   the lens carrier guide further comprises a pair of retainers that are coupled to the pair of symmetrical installation surfaces of the lens carrier, and
   the pair of retainers comprise through-holes through which the needle bearings are exposed such that the needle bearings are in slidable contact with the pair of inclined surfaces of the side part when the side part is in contact with the lens carrier.

2. The camera lens assembly as claimed in claim 1, wherein an angle between the pair of symmetrical installation surfaces of the lens carrier is an obtuse angle.

3. The camera lens assembly as claimed in claim 1, wherein an angle between the pair of symmetrical installation surfaces of the lens carrier is a right angle.

4. The camera lens assembly as claimed in claim 1, wherein
the base further comprises protrusions that are inserted into grooves in the lens carrier so that the lens carrier is movable in the optical axis direction.

5. The camera lens assembly as claimed in claim 1, wherein the auto-focusing driving part includes:
a first magnet disposed on one side surface of the lens carrier;
a first coil disposed at an inner side of the base to face the first magnet; and
a first yoke disposed behind the first coil.

6. The camera lens assembly as claimed in claim 5, further comprising:
blades disposed in the lens carrier, wherein the blades overlap over one another; and
a light amount adjustment driving part disposed at one edge of the lens carrier that simultaneously rotates all of the blades to adjust an opening degree of a light passing hole in the camera lens assembly.

7. The camera lens assembly as claimed in claim 6, wherein the light amount adjustment driving part includes:
a driving arm disposed on the lens carrier, wherein the driving arm comprises two ends that are hinge-connected to the blades;
a second magnet that is fixed to and rotates together with the driving arm; and
a second coil disposed in the lens carrier and that rotates the second magnet.

8. The camera lens assembly as claimed in claim 7, wherein
the second magnet is a circular magnet,
the light amount adjustment driving part includes a yoke of which one end is disposed adjacent to the circular magnet, and
the circular magnet rotates in a clockwise direction or a counterclockwise direction depending on a direction of a current flowing to the second coil.

9. The camera lens assembly as claimed in claim 6, wherein the light amount adjustment driving part further includes a flexible printed circuit board (FPCB) of which a first portion is adhered to the lens carrier, a second portion is adhered to the base, and a third portion between the first and second portions is curved to have a margin length.

10. The camera lens assembly as claimed in claim 1, wherein
the lens includes a plurality of lenses, and
an aperture stop is disposed between any two of the plurality of lenses.

11. The camera lens assembly as claimed in claim 10, wherein a distance between the two lenses between which the aperture stop is disposed is larger than distances between other adjacent lenses among the plurality of lenses.

12. A camera lens assembly comprising:
a lens;
a base having a concave portion;
a lens carrier having a convex portion and that moves the lens forward and backward in an optical axis direction of the camera lens assembly, wherein the lens carrier is disposed on the base and slides in the optical axis direction;
an auto-focusing driving part having one portion disposed on the base and another portion disposed in the lens carrier to drive the lens carrier forward and backward in the optical axis direction using electromagnetic force; and
a lens carrier guide that supports ball bearings, wherein
the convex portion of the lens carrier fits with the concave portion of the base,
the ball bearings are disposed between the convex portion of the lens carrier and the concave portion of the base,
the base comprises:
a body with a space in which the lens carrier is disposed; and
a side part that is detachably snapped on to one side of the body,
one side of the lens carrier comprises a pair of symmetrical installation surfaces that each comprises recessed grooves into which the ball bearings are inserted,
the side part of the base comprises:
a pair of inclined surfaces that face the pair of symmetrical installation surfaces of the lens carrier; and
a pair of coupling grooves into which a pair of coupling protrusions of the base are snapped into,
the lens carrier guide further comprises a pair of retainers that are coupled to the pair of symmetrical installation surfaces of the lens carrier, and
the pair of retainers comprise through-holes through which the ball bearings are exposed such that the ball bearings are in slidable contact with the pair of inclined surfaces of the side part when the side part is in contact with the lens carrier.

13. The camera lens assembly as claimed in claim 12, further comprising blades disposed in the lens carrier, wherein the blades overlap over one another.

14. The camera lens assembly as claimed in claim 13, further comprising a light amount adjustment driving part disposed at one edge of the lens carrier that simultaneously rotates all of the blades to adjust an opening degree of a light passing hole in the camera lens assembly.

15. The camera lens assembly as claimed in claim 14, wherein the auto-focusing driving part faces the light amount adjustment driving part.

16. The camera lens assembly as claimed in claim 12, wherein the ball bearings are in point contact with three points on the camera lens assembly.

* * * * *